US010621696B2

(12) United States Patent
Viswanathan et al.

(10) Patent No.: US 10,621,696 B2
(45) Date of Patent: *Apr. 14, 2020

(54) DEEP CONVOLUTIONAL IMAGE UP-SAMPLING

(71) Applicant: HERE GLOBAL B.V., Eindhoven (NL)

(72) Inventors: Anirudh Viswanathan, Berkeley, CA (US); Peter Christian, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/527,780

(22) Filed: Jul. 31, 2019

(65) Prior Publication Data

US 2019/0355094 A1 Nov. 21, 2019

Related U.S. Application Data

(63) Continuation of application No. 15/479,675, filed on Apr. 5, 2017, now Pat. No. 10,410,322.

(51) Int. Cl.
*G06T 3/40* (2006.01)
(52) U.S. Cl.
CPC .......... *G06T 3/4046* (2013.01); *G06T 3/4053* (2013.01); *G06T 3/4092* (2013.01)
(58) Field of Classification Search
CPC .... G06T 3/4046; G06T 3/4053; G06T 3/4092
See application file for complete search history.

(56) References Cited

U.S. PATENT DOCUMENTS

| 7,409,372 | B2 | 8/2008 | Staelin et al. |
| 9,405,960 | B2 | 8/2016 | Yin et al. |
| 9,606,539 | B1 | 3/2017 | Kentley et al. |
| 10,019,642 | B1 | 7/2018 | Navarrete Michelini et al. |
| 2007/0041663 | A1 | 2/2007 | Cho et al. |
| 2014/0193032 | A1 | 7/2014 | Zhang et al. |
| 2014/0350839 | A1 | 11/2014 | Pack et al. |
| 2015/0228077 | A1 | 8/2015 | Menashe et al. |
| 2017/0147905 | A1 | 5/2017 | Huang et al. |
| 2017/0256033 | A1 | 9/2017 | Tuzel et al. |

(Continued)

FOREIGN PATENT DOCUMENTS

WO WO 2016/019484 A1 2/2016
WO WO 2016/132145 A1 8/2016

OTHER PUBLICATIONS

Cui, Zhen, et al., "Deep Network Cascade for Image Super-Resolution", ECCV 2014, pp. 49-64, retrieved from <https://www.semanticscholar.org/paper/Deep-Network-Cascade-for-Image-Super-resolution-Cui-Chang/388874cac122fd33ef8eef839392b60cf6e9c508> on Aug. 25, 2017.

(Continued)

*Primary Examiner* — Carol Wang
(74) *Attorney, Agent, or Firm* — Alston & Bird LLP

(57) ABSTRACT

An image and/or temporal sequence of images is received. The image and/or sequence of images was captured by an image capturing device of an apparatus and was down-sampled thereby. A scale of the image(s) is determined. An up-sampling network receives the image(s) and the scale. The up-sampling network determines appropriate network weights based on the scale. Based on the appropriate network weights, the up-sampling network generates a higher resolution image having a pre-defined scale.

21 Claims, 9 Drawing Sheets

(56) References Cited

U.S. PATENT DOCUMENTS

2018/0282955 A1    10/2018    McClendon

OTHER PUBLICATIONS

Glasner, Daniel, et al., "Super-Resolution form a Single Image", The Weizmann Institute of Science, 8 pages, Israel, retrieved from <http://www.wisdom.weizmann.ac.il/~vision/single_image_SR/files/single_image_SR.pdf> on Aug. 25, 2017.
Hui, Tak-Wai, et al., "Depth Map Super-Resolution by Deep Multi-Scale Guidance", European Conference on Computer Vision, 2016, 17 pages, retrieved from <http://personal.ie.cuhk.edu.hk/~ccloy/files/eccv_2016_depth.pdf> in Aug. 25, 2017.
Shi, Wenzhe, et al., "Real-Time Single Image and Video Super-Resolution Using and Efficient Sub-Pixel Convolutional Neural Network", 2016 Computer Vision Pattern Recognition Conference, retrieved from <http://openaccess.thecvf.com/content_cvpr_2016/papers/Shi_Real_Time_Single_Image_CVPR_2016_paper.pdf> on Aug. 25, 2017.
Tasfi, Norman, "Image Scaling Using Deep Convolutional Neural Networks", Flipboard Engineering, May 6, 2015, 27 pages, retrieved from <http://engineering.flipboard.com/2015/05/scaling-convents> on Aug. 25, 2017.
U.S. Appl. No. 15/375,513, "Pose Error Estimation and Localization Using Static Features", Unpublished (filed Dec. 12, 2016), Richard Kwant, inventor), (Here Global B.V., assignee).

DEEP CONVOLUTIONAL IMAGE UP-SAMPLING

CROSS-REFERENCE TO RELATED APPLICATIONS

This application is a continuation of U.S. application Ser. No. 15/479,675, filed Apr. 5, 2017, the content of which is hereby incorporated herein in its entirety by reference.

TECHNOLOGICAL FIELD

An example embodiment relates generally to image up-sampling. In particular, an example embodiment generally relates to up-sampling low resolution images to provide a reconstructed image having sharp features.

BACKGROUND

Consumer vehicles are capable of capturing high-resolution images. For example, consumer vehicles may capture a high-resolution image for use in image-based localization techniques, obstacle detection, and/or the like for assisted and/or autonomous driving. Unfortunately, these images are too large to transmit through most vehicles' constrained bandwidth. Thus, these high-resolution images are generally down-sampled for transmission to other computing entities, Cloud-based computing networks, and/or the like. The feature detection within the down-sampled images is difficult and can be unreliable. However, up-sampling of the images generally leads to artifacts, causing relevant image details to be lost. For example, a double yellow line may be blurred into a single yellow line. The loss of relevant image detail may lead to incorrect localization determinations when using image-based localization techniques.

BRIEF SUMMARY

Example embodiments, provide methods, apparatus, computer programs products, and systems for generating a higher resolution image based on a down-sampled image and/or a temporal sequence of down-sampled images. In an example embodiment, the higher resolution image preserves features of the down-sampled image and/or the original full resolution image that was down-sampled to generate the down-sampled image. For example, the features in the higher resolution image may be sharp enough to be accurately detected by a feature detector. In an example embodiment, the higher resolution image may be of a pre-defined and/or configurable resolution and/or size. At least some example embodiments allow for an accurate, real time (or near real time) localization of a vehicle from which the original full resolution image was captured. For example, an example embodiment may provide for a Cloud-based determination of a vehicle wherein communication between the vehicle apparatus onboard the vehicle and a Cloud-based computing network and/or environment is bandwidth constrained. In an example embodiment, feature information/data may be extracted from the higher resolution image to generate, develop, and/or update a feature map. For example, the feature map may be stored as a layer of a digital map and/or a map tile thereof. For example, one or more map tiles comprising a feature map layer may be provided to one or more vehicle apparatuses for use in localization determinations.

In an example embodiment, an image and/or temporal sequence of images is received. The image and/or sequence of images was captured by an image capturing device of a vehicle apparatus onboard a vehicle and was down-sampled thereby. A scale of the image(s) is determined. An up-sampling network receives the image(s) and the scale. The up-sampling network determines appropriate network weights based on the scale. Based on the appropriate network weights, the up-sampling network generates a higher resolution image having a pre-defined scale.

In an example embodiment, an apparatus that is part of and/or in communication with a Cloud-based computing environment may be provided. In an example embodiment, the apparatus comprises a communications interface for communicating with the Cloud-based computing environment; a graphical processing unit configured to operate an up-sampling network; and a processing unit. The processing unit is configured to receive an image. The image is (a) captured by an image capturing device of a vehicle apparatus onboard a vehicle and (b) down-sampled by the vehicle apparatus. The processing unit may be further configured to determine a scale of the image; cause the up-sampling network to receive the image and the scale of the image; cause the up-sampling network to determine appropriate network weights based on the scale of the image; and cause the up-sampling network to generate an higher resolution image having a pre-defined scale based on the image and the appropriate network weights. In an example embodiment, the up-sampling network is a deep neural network.

In an example embodiment, training the up-sampling network comprises receiving or accessing a full resolution image; and generating an instance of training data. The instance of training data comprises (a) a plurality of down-sampled training images, each of the down-sampled training images being a down-sampled representation of the full resolution image at a particular scale and (b) the full resolution image. In an example embodiment, training the up-sampling network further comprises receiving by a neural network the instance of training data; for a particular down-sampled training image of the instance of training data, generating an up-sampled training image; determining a loss function based on the up-sampled training image and the training image; and modifying one or more network weights based on the loss function. In an example embodiment, the higher resolution image is of the same resolution as the full resolution image.

In an example embodiment, the higher resolution image is a composite higher resolution image. Receiving the image comprises receiving a temporal sequence of images comprising a plurality of down-sampled images captured by the image capturing device. Generating the higher resolution image comprises up-sampling each of the plurality of down-sampled images to generate a temporal sequence of higher resolution images and performing a convolution of the temporal sequence of higher resolution images to generate the higher resolution image. In an example embodiment, training the up-sampling network comprises receiving or accessing a temporal sequence of full resolution images; and generating an instance of training data. The instance of training data comprises (a) a plurality of temporal sequences of down-sampled images, each of the temporal sequences of down-sampled images being a down-sampled representation of the temporal sequence of full resolution images at a particular scale and (b) the temporal sequence of full resolution images. In an example embodiment, training the up-sampling network further comprises receiving by a neural network the instance of training data; for a particular temporal sequence of the down-sampled images, generating a temporal sequence of higher resolution images; performing a convolution of the temporal sequence of higher resolution images to generate a composite higher resolution image; determining a loss function based on the composite up-sampled training image and at least one full resolution image of the temporal sequence of full resolution images; and modifying one or more network weights based on the loss function. In an example embodiment, the higher resolution image is of the same resolution as the full resolution image.

In an example embodiment, the up-sampling network is defined by a plurality of sets of network weights, wherein each set of network weights corresponds to a scale of a series of scales. In an example embodiment, the series of scales comprises a first scale and a second scale. The first scale corresponds to a first set of network weights and the second scale corresponds to a second set of network weights. The scale of the image is between the first scale and the second scale. The appropriate weights are determined based on the first set of network weights and the second set of network weights. In an example embodiment, determining the scale of the image comprises at least one of analyzing the image, analyzing meta data corresponding to the image.

In an example embodiment, the processing unit is further configured to perform an image-based localization technique based on the higher resolution image to determine corrected pose information; and provide the corrected pose information, wherein the corrected pose information is received by the vehicle apparatus and the vehicle apparatus determines at least one routing decision based on the corrected pose information. In an example embodiment, the processing unit is further configured to receive pose information corresponding to the image; extract feature information from the higher resolution image, the feature information corresponding to at least one feature detected within the higher resolution image; and update a feature map based on the pose information and the extracted feature information, the feature map being a layer of a digital map.

In an example embodiment, a method is provided. The method comprises receiving an image. The image is (a) captured by an image capturing device of a vehicle apparatus onboard a vehicle and (b) down-sampled by the vehicle apparatus. The method may further comprise determining a scale of the image; receiving, by an up-sampling network, the image and the scale of the image; determining, by the up-sampling network, appropriate network weights based on the scale of the image; and generating, by the up-sampling network, an higher resolution image having a pre-defined scale based on the image and the appropriate network weights.

In an example embodiment, training the up-sampling network comprises receiving or accessing a full resolution image; and generating an instance of training data. The instance of training data comprises (a) a plurality of down-sampled training images, each of the down-sampled training images being a down-sampled representation of the full resolution image at a particular scale and (b) the full resolution image. In an example embodiment, training the up-sampling network further comprises receiving by a neural network the instance of training data; for a particular down-sampled training image of the instance of training data, generating an up-sampled training image; determining a loss function based on the up-sampled training image and the training image; and modifying one or more network weights based on the loss function. In an example embodiment, the higher resolution image is of the same resolution as the full resolution image.

In an example embodiment, the higher resolution image is a composite higher resolution image. Receiving the image comprises receiving a temporal sequence of images comprising a plurality of down-sampled images captured by the image capturing device. Generating the higher resolution image comprises up-sampling each of the plurality of down-sampled images to generate a temporal sequence of higher resolution images and performing a convolution of the temporal sequence of higher resolution images to generate the higher resolution image. In an example embodiment, training the up-sampling network comprises receiving or accessing a temporal sequence of full resolution images; and generating an instance of training data. The instance of training data comprises (a) a plurality of temporal sequences of down-sampled images, each of the temporal sequences of down-sampled images being a down-sampled representation of the temporal sequence of full resolution images at a particular scale and (b) the temporal sequence of full resolution images. In an example embodiment, training the up-sampling network further comprises receiving by a neural network the instance of training data; for a particular temporal sequence of the down-sampled images, generating a temporal sequence of higher resolution images; performing a convolution of the temporal sequence of higher resolution images to generate a composite higher resolution image; determining a loss function based on the composite up-sampled training image and at least one full resolution image of the temporal sequence of full resolution images; and modifying one or more network weights based on the loss function. In an example embodiment, the higher resolution image is of the same resolution as the full resolution image.

In an example embodiment, the up-sampling network is defined by a plurality of sets of network weights, wherein each set of network weights corresponds to a scale of a series of scales. In an example embodiment, the series of scales comprises a first scale and a second scale. The first scale corresponds to a first set of network weights and the second scale corresponds to a second set of network weights. The scale of the image is between the first scale and the second scale. The appropriate weights are determined based on the first set of network weights and the second set of network weights. In an example embodiment, determining the scale of the image comprises at least one of analyzing the image, analyzing meta data corresponding to the image.

In an example embodiment, the method further comprises performing an image-based localization technique based on the higher resolution image to determine corrected pose information; and providing the corrected pose information, wherein the corrected pose information is received by the vehicle apparatus and the vehicle apparatus determines at least one routing decision based on the corrected pose information. In an example embodiment, the method further comprises receiving pose information corresponding to the image; extracting feature information from the higher resolution image, the feature information corresponding to at least one feature detected within the higher resolution image; and updating a feature map based on the pose information and the extracted feature information, the feature map being a layer of a digital map.

In accordance with an example embodiment, an apparatus is provided that comprises at least one processor, at least one memory storing computer program code, and a pose error network, with the at least one memory and the computer program code configured to, with the processor, cause the apparatus to at least receive an image. The image is (a) captured by an image capturing device of a vehicle apparatus onboard a vehicle and (b) down-sampled by the vehicle apparatus. The at least one memory and the computer program code are further configured to, with the processor, cause the apparatus to at least determine a scale of the image; receive, by an up-sampling network, the image and the scale of the image; determine, by the up-sampling network, appropriate network weights based on the scale of the image; and generate, by the up-sampling network, an higher resolution image having a pre-defined scale based on the image and the appropriate network weights.

In an example embodiment, training the up-sampling network comprises receiving or accessing a full resolution image; and generating an instance of training data. The instance of training data comprises (a) a plurality of down-sampled training images, each of the down-sampled training images being a down-sampled representation of the full resolution image at a particular scale and (b) the full resolution image. In an example embodiment, training the up-sampling network further comprises receiving by a neural network the instance of training data; for a particular down-sampled training image of the instance of training data, generating an up-sampled training image; determining a loss function based on the up-sampled training image and the training image; and modifying one or more network weights based on the loss function. In an example embodiment, the higher resolution image is of the same resolution as the full resolution image.

In an example embodiment, the higher resolution image is a composite higher resolution image. Receiving the image comprises receiving a temporal sequence of images comprising a plurality of down-sampled images captured by the image capturing device. Generating the higher resolution image comprises up-sampling each of the plurality of down-sampled images to generate a temporal sequence of higher resolution images and performing a convolution of the temporal sequence of higher resolution images to generate the higher resolution image. In an example embodiment, training the up-sampling network comprises receiving or accessing a temporal sequence of full resolution images; and generating an instance of training data. The instance of training data comprises (a) a plurality of temporal sequences of down-sampled images, each of the temporal sequences of down-sampled images being a down-sampled representation of the temporal sequence of full resolution images at a particular scale and (b) the temporal sequence of full resolution images. In an example embodiment, training the up-sampling network further comprises receiving by a neural network the instance of training data; for a particular temporal sequence of the down-sampled images, generating a temporal sequence of higher resolution images; performing a convolution of the temporal sequence of higher resolution images to generate a composite higher resolution image; determining a loss function based on the composite up-sampled training image and at least one full resolution image of the temporal sequence of full resolution images; and modifying one or more network weights based on the loss function. In an example embodiment, the higher resolution image is of the same resolution as the full resolution image.

In an example embodiment, the up-sampling network is defined by a plurality of sets of network weights, wherein each set of network weights corresponds to a scale of a series of scales. In an example embodiment, the series of scales comprises a first scale and a second scale. The first scale corresponds to a first set of network weights and the second scale corresponds to a second set of network weights. The scale of the image is between the first scale and the second scale. The appropriate weights are determined based on the first set of network weights and the second set of network weights. In an example embodiment, determining the scale of the image comprises at least one of analyzing the image, analyzing meta data corresponding to the image.

In an example embodiment, the at least one memory and the computer program code are further configured to, with the processor, cause the apparatus to at least perform an image-based localization technique based on the higher resolution image to determine corrected pose information; and provide the corrected pose information, wherein the corrected pose information is received by the vehicle apparatus and the vehicle apparatus determines at least one routing decision based on the corrected pose information. In an example embodiment, the at least one memory and the computer program code are further configured to, with the processor, cause the apparatus to at least receive pose information corresponding to the image; extract feature information from the higher resolution image, the feature information corresponding to at least one feature detected within the higher resolution image; and update a feature map based on the pose information and the extracted feature information, the feature map being a layer of a digital map.

In accordance with an example embodiment, a computer program product is provided that comprises at least one non-transitory computer-readable storage medium having computer-executable program code instructions stored therein with the computer-executable program code instructions comprising program code instructions configured to receive an image. The image is (a) captured by an image capturing device of a vehicle apparatus onboard a vehicle and (b) down-sampled by the vehicle apparatus. The computer-executable program code instructions further comprise program code instructions configured to determine a scale of the image; receive, by an up-sampling network, the image and the scale of the image; determine, by the up-sampling network, appropriate network weights based on the scale of the image; and generate, by the up-sampling network, an higher resolution image having a pre-defined scale based on the image and the appropriate network weights.

In an example embodiment, training the up-sampling network comprises receiving or accessing a full resolution image; and generating an instance of training data. The instance of training data comprises (a) a plurality of down-sampled training images, each of the down-sampled training images being a down-sampled representation of the full resolution image at a particular scale and (b) the full resolution image. In an example embodiment, training the up-sampling network further comprises receiving by a neural network the instance of training data; for a particular down-sampled training image of the instance of training data, generating an up-sampled training image; determining a loss function based on the up-sampled training image and the training image; and modifying one or more network weights based on the loss function. In an example embodiment, the higher resolution image is of the same resolution as the full resolution image.

In an example embodiment, the higher resolution image is a composite higher resolution image. Receiving the image comprises receiving a temporal sequence of images comprising a plurality of down-sampled images captured by the image capturing device. Generating the higher resolution image comprises up-sampling each of the plurality of down-sampled images to generate a temporal sequence of higher resolution images and performing a convolution of the temporal sequence of higher resolution images to generate the higher resolution image. In an example embodiment, training the up-sampling network comprises receiving or accessing a temporal sequence of full resolution images; and generating an instance of training data. The instance of training data comprises (a) a plurality of temporal sequences of down-sampled images, each of the temporal sequences of down-sampled images being a down-sampled representation of the temporal sequence of full resolution images at a particular scale and (b) the temporal sequence of full resolution images. In an example embodiment, training the up-sampling network further comprises receiving by a neural network the instance of training data; for a particular temporal sequence of the down-sampled images, generating a temporal sequence of higher resolution images; performing a convolution of the temporal sequence of higher resolution images to generate a composite higher resolution image; determining a loss function based on the composite up-sampled training image and at least one full resolution image of the temporal sequence of full resolution images; and modifying one or more network weights based on the loss function. In an example embodiment, the higher resolution image is of the same resolution as the full resolution image.

In an example embodiment, the up-sampling network is defined by a plurality of sets of network weights, wherein each set of network weights corresponds to a scale of a series of scales. In an example embodiment, the series of scales comprises a first scale and a second scale. The first scale corresponds to a first set of network weights and the second scale corresponds to a second set of network weights. The scale of the image is between the first scale and the second scale. The appropriate weights are determined based on the first set of network weights and the second set of network weights. In an example embodiment, determining the scale of the image comprises at least one of analyzing the image, analyzing meta data corresponding to the image.

In an example embodiment, the computer-executable program code instructions further comprise program code instructions configured to perform an image-based localization technique based on the higher resolution image to determine corrected pose information; and provide the corrected pose information, wherein the corrected pose information is received by the vehicle apparatus and the vehicle apparatus determines at least one routing decision based on the corrected pose information. In an example embodiment, the computer-executable program code instructions further comprise program code instructions configured to receive pose information corresponding to the image; extract feature information from the higher resolution image, the feature information corresponding to at least one feature detected within the higher resolution image; and update a feature map based on the pose information and the extracted feature information, the feature map being a layer of a digital map.

In accordance with yet another example embodiment of the present invention, an apparatus is provided that comprises means for receiving an image. The image is (a) captured by an image capturing device of a vehicle apparatus onboard a vehicle and (b) down-sampled by the vehicle apparatus. In certain embodiments, the apparatus comprises means for determining a scale of the image. In certain embodiments, the apparatus comprises means for receiving, by an up-sampling network, the image and the scale of the image. In certain embodiments, the apparatus comprises means for determining, by the up-sampling network, appropriate network weights based on the scale of the image. In certain embodiments, the apparatus comprises means for generating, by the up-sampling network, a higher resolution image having a pre-defined scale based on the image and the appropriate network weights.

BRIEF DESCRIPTION OF THE DRAWINGS

Figure 1:
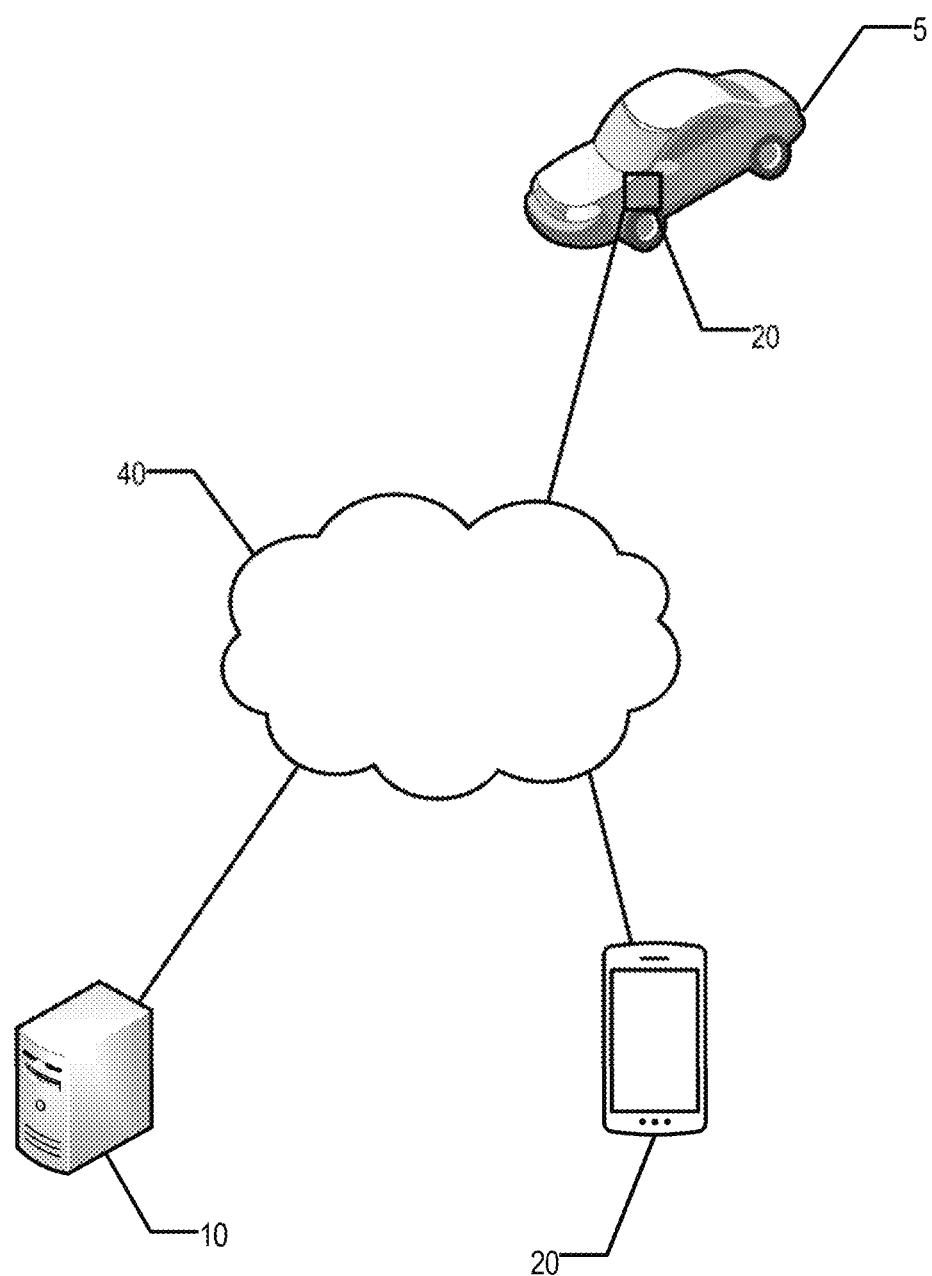
Figure 2A:
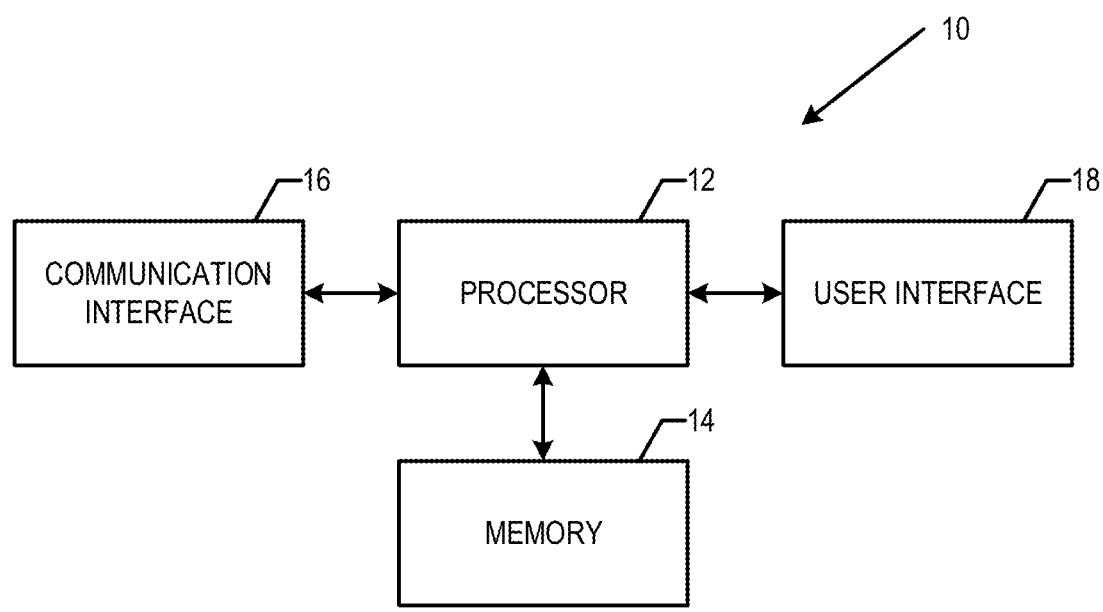
Figure 2B:
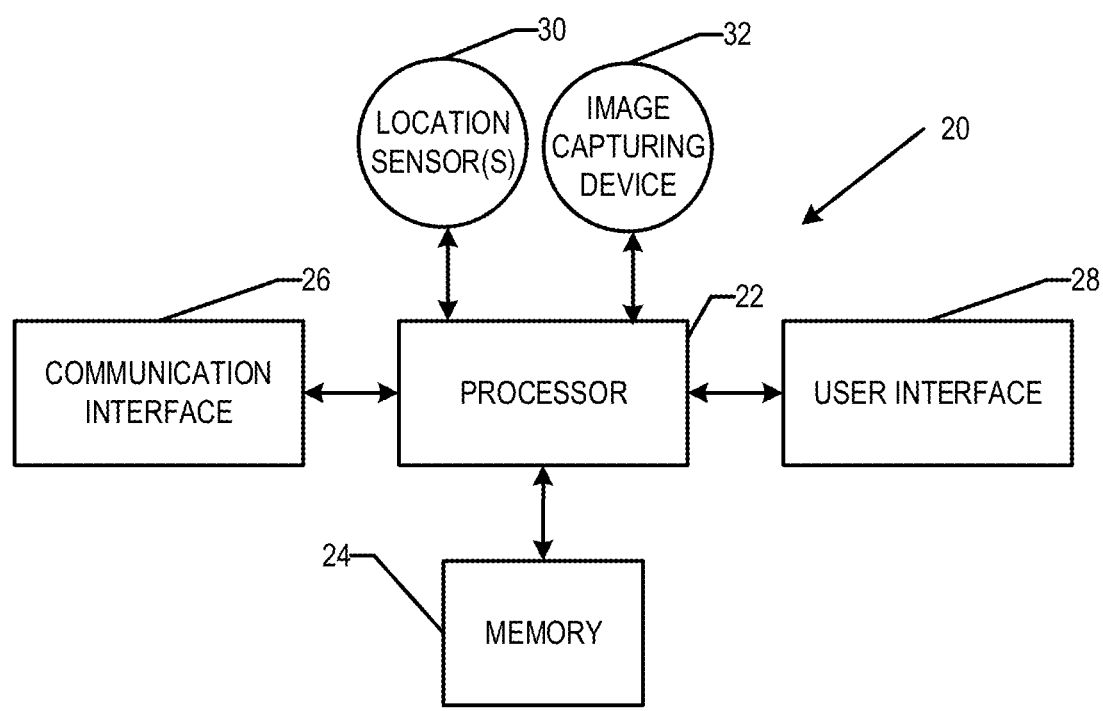
Figure 3:
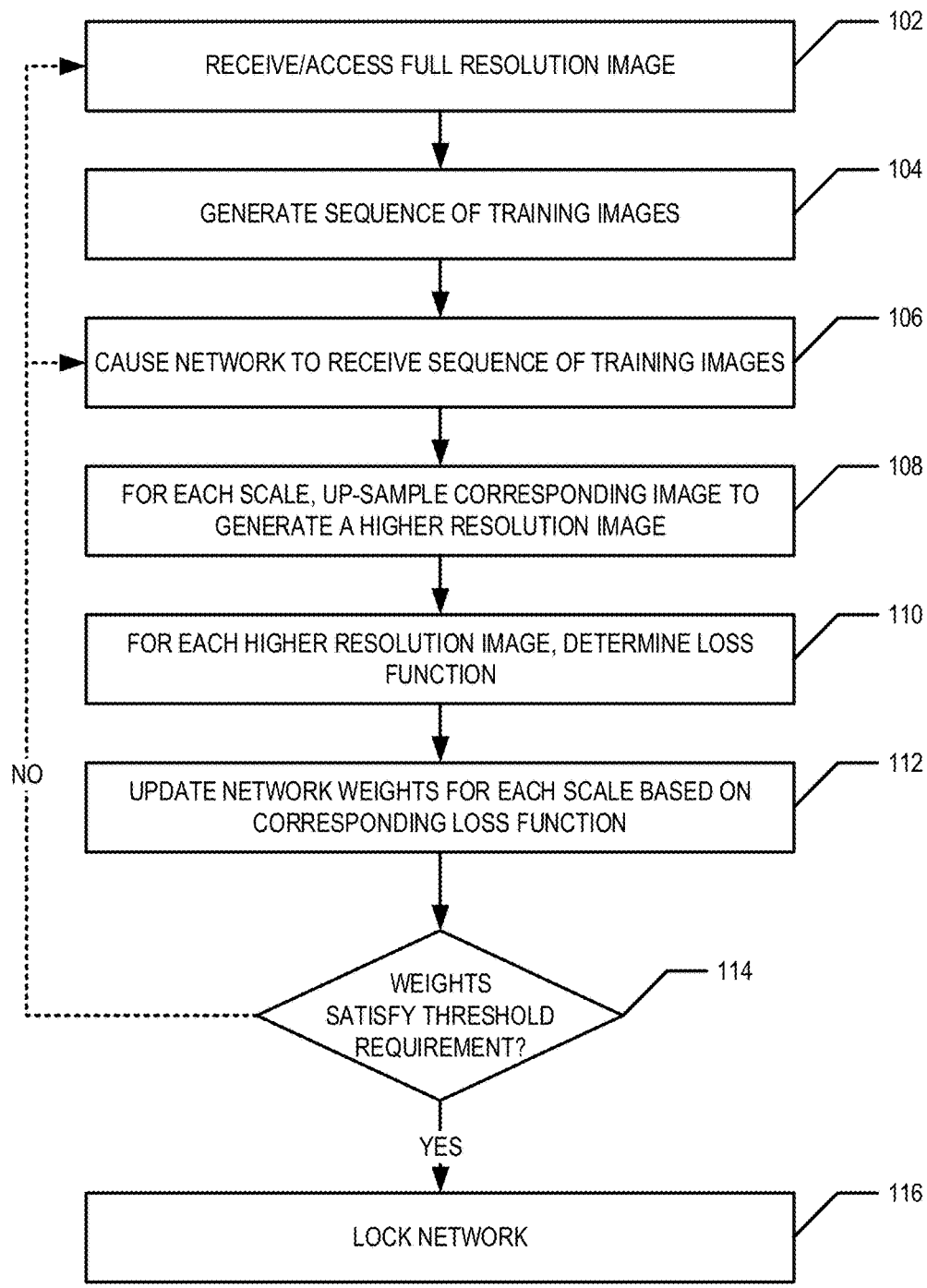
Figure 4:
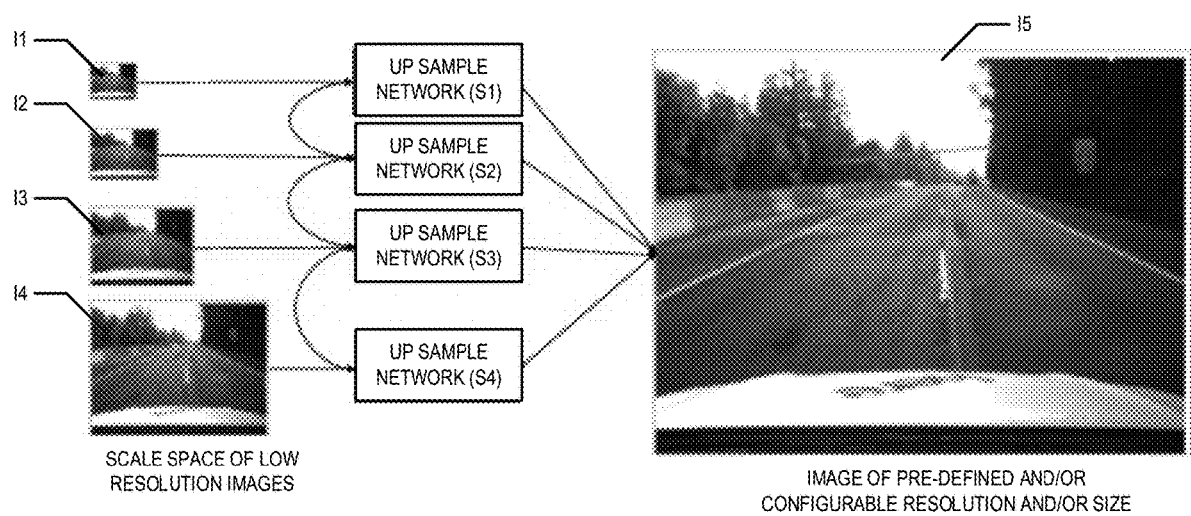
Figure 5:
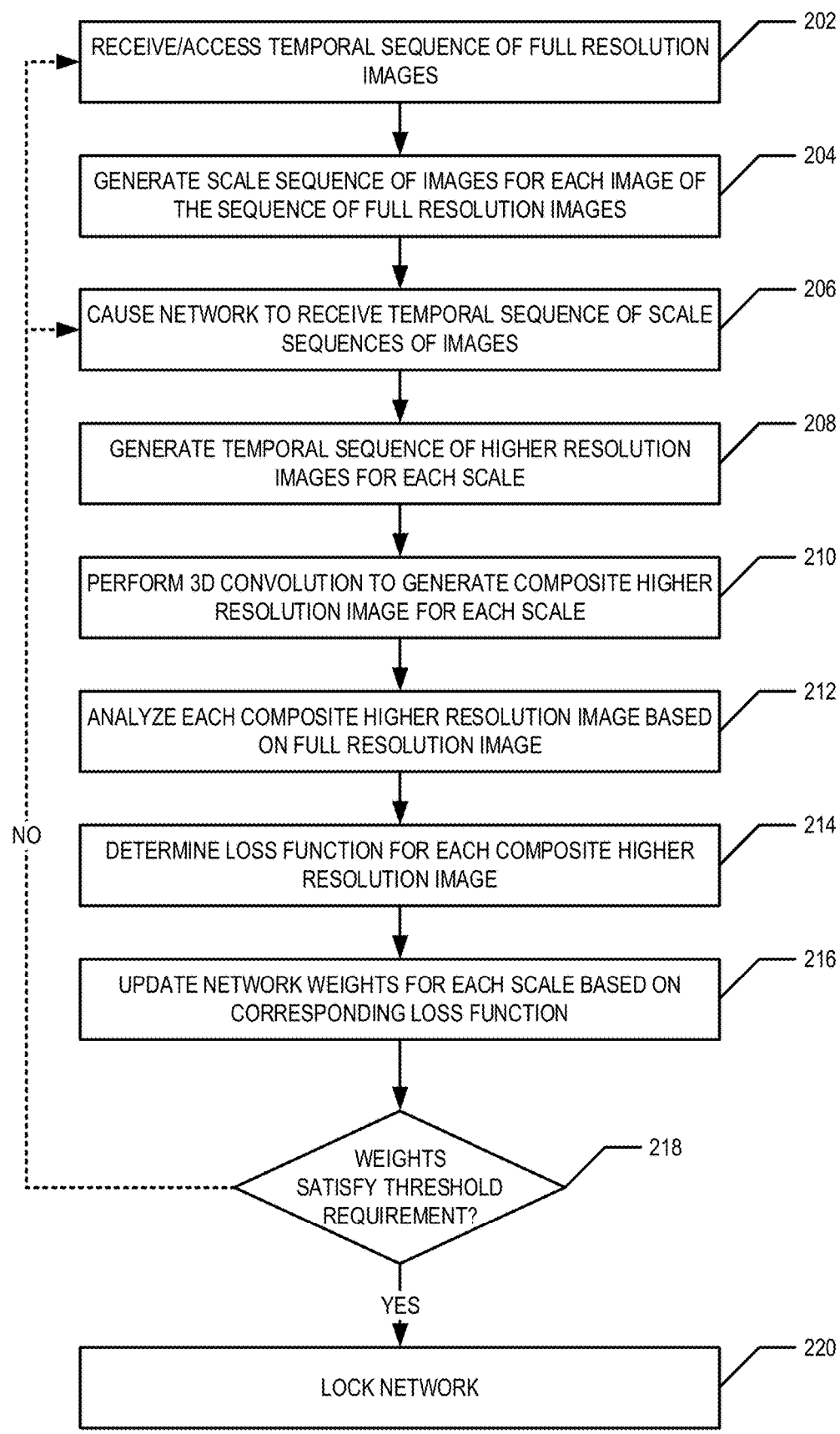
Figure 6:
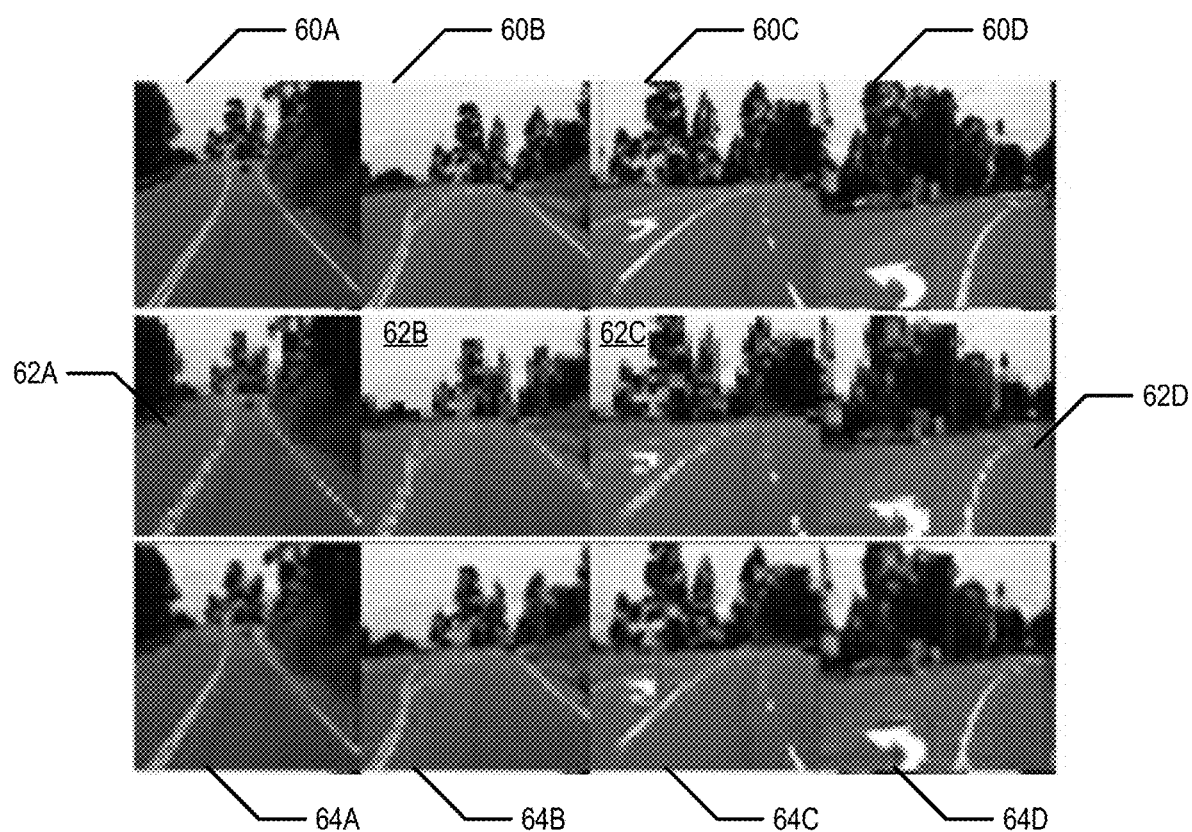
Figure 7:
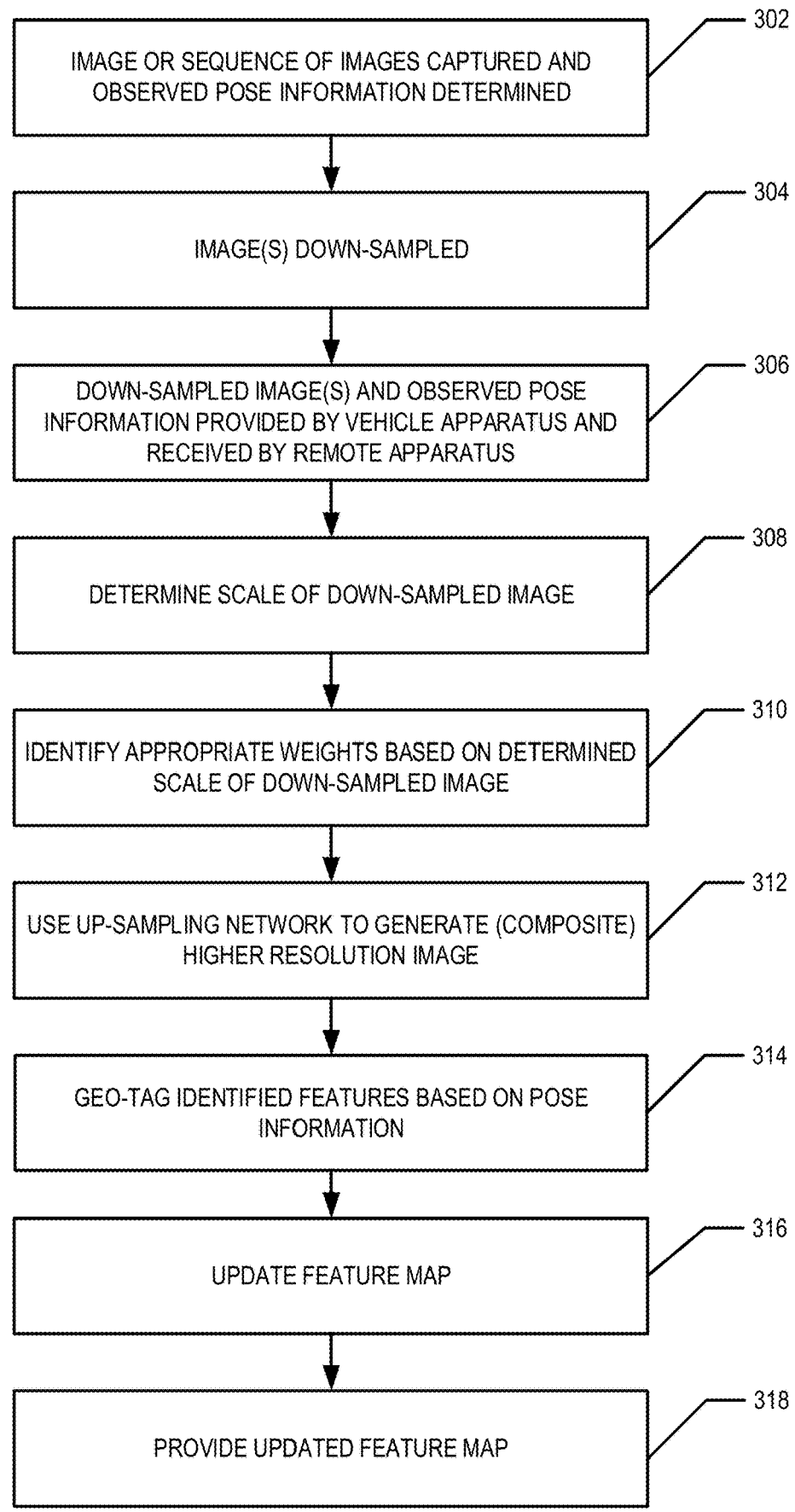
Figure 8:
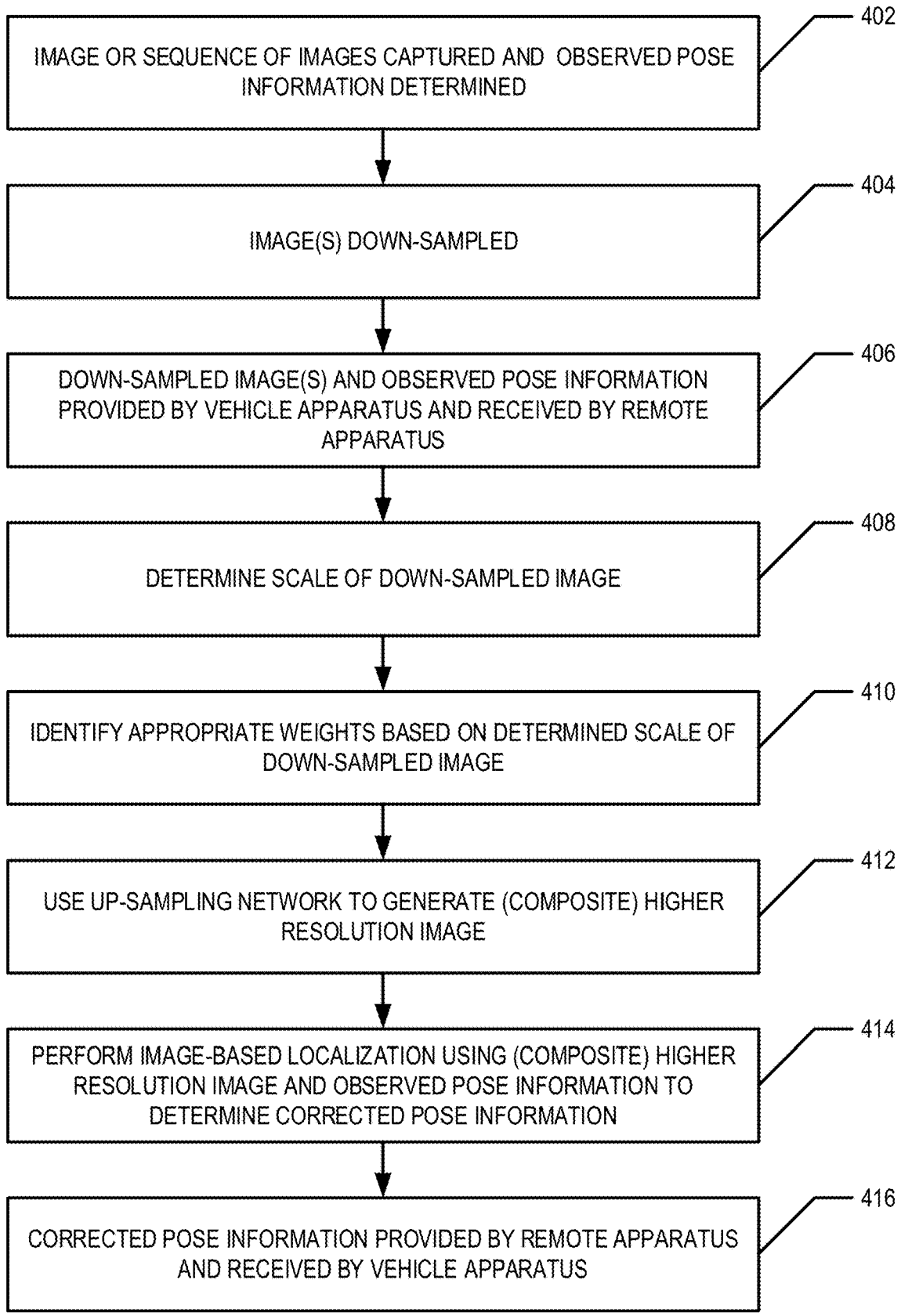

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a remote apparatus that may be specifically configured in accordance with an example embodiment;

FIG. 2B is a block diagram of a vehicle apparatus that may be specifically configured in accordance with an example embodiment;

FIG. 3 is a schematic illustration of using an up-sampling network to reconstruct a full resolution image, in accordance with an example embodiment;

FIG. 4 is a flowchart illustrating operations performed, such as by the apparatus of FIG. 2A, to train the up-sampling network, in accordance with an example embodiment;

FIG. 5 is a flowchart illustrating operations performed, such as by the apparatus of FIG. 2A, to train the up-sampling network, in accordance with an example embodiment;

FIG. 6 shows some example full resolution images, images corresponding to full resolution images that have been up-sampled using a traditional up-sampling technique, and images corresponding to the full resolution images that have been up-sampled using a technique of an example embodiment of the present invention;

FIG. 7 is a flowchart illustrating operations performed, such as by the remote apparatus of FIG. 2A or the vehicle apparatus of FIG. 2B, to generate and/or update a feature map, in accordance with an example embodiment; and FIG. 8 is a flowchart illustrating operations performed, such as by the remote apparatus of FIG. 2A or the vehicle apparatus of FIG. 2B, to perform localization of a vehicle, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to generate a higher resolution image, for example, having sharp features that may be used for feature detection. In example embodiments, a vehicle apparatus onboard a vehicle may capture a high-resolution, full-resolution, and/or the like image. In various embodiments, due to bandwidth constraints, the high-resolution, full-resolution, and/or the like image may be down-sampled to generate a low resolution image. The low resolution image may then be provided (e.g., transmitted) by the vehicle apparatus and received by a remote apparatus (e.g., a Cloud-based computing network apparatus, and/or the like). In an example embodiment, the remote apparatus may then use an up-sampling network to generate a reconstructed image having a higher resolution than the low resolution image and having sharp enough features such that the features may be detected within the reconstructed image.

The features detected in the reconstructed image may be used to perform image-based localization corresponding to the vehicle, generate and/or update a feature map comprising feature information/data that may be used in image-based localization, and/or the like. In an example embodiment, the image-based localization performed based on the reconstructed image generated based on the received low resolution is performed in real and/or near real time so as to allow for autonomous and/or assisted driving of a vehicle.

In an example embodiment, a temporal sequence of low resolution images are used to generate the reconstructed image using the up-sampling network. For example, the up-sampling network (or another network) may perform a three-dimensional convolution of the temporal sequence of low resolution images (or a temporal sequence of reconstructed images generated based on the sequence of low resolution images) to further provide a reconstructed image having sharp features and avoiding global image blurring.

In an example embodiment, the up-sampling network may be a trained deep net and/or neural network. In an example embodiment, the up-sampling network may be trained to generate a reconstructed image from a low resolution image and/or a temporal sequence of low resolution images at a plurality of scales. For example, the up-sampling network may be trained to receive a low resolution image generated by applying a first down-sampling factor $s_1$ and generate a reconstructed image using a first set of one or more network weights and/or parameters. The up-sampling image network may also be trained to receive a low resolution image generated by applying a second down-sampling factor $s_2$ and generate a reconstructed image using a second set of one or more network weights and/or parameters. The up-sampling image network may also be trained to receive a low resolution image generated by applying an intermediary down-sampling factor $s_i$ that is between the first down-sampling factor and the second down-sampling factor (e.g., $s_1<s_i<s_2$) using a set of one or more network weights and/or parameters that are determined using a (e.g., non-linear) interpolation between the first and second set of one or more network weights.

An example embodiment of the present invention provides a solution to the computer-related technological problem of transmitting images over a network having bandwidth constraints for analysis by a Cloud-based computing network. An example embodiment of the present invention provides a solution to the computer-related technological problem of performing feature detection based on image with reduced resolution such that the image may be transmitted over a network having bandwidth constraints. For example, an example embodiment of the present invention provides for improving computer-related technology by providing a technique for feature detection based on images having reduced resolution such that feature information/data for feature map generation and/or updates and localization processes may be completed using Cloud-based computing environments to decrease onboard processing requirements for autonomous and/or assisted driving vehicles wherein communication between the vehicle and the Cloud-based computing environment is bandwidth constrained.

FIG. 1 provides an illustration of an example system that can be used in conjunction with various embodiments of the present invention. As shown in FIG. 1, the system may include one or more vehicle apparatuses 20, one or more remote apparatuses 10, one or more networks 40, and/or the like. In various embodiments, the vehicle apparatus 20 may be an in vehicle navigation system, vehicle control system, a mobile computing device, and/or the like. For example, a vehicle apparatus 20 may be an in vehicle routing and navigation system mounted within and/or be on-board a vehicle 5 such as a motor vehicle, non-motor vehicle, automobile, car, scooter, truck, van, bus, motorcycle, bicycle, Segway, golf cart, and/or the like. In various embodiments, the vehicle apparatus 20 may be a smartphone, tablet, personal digital assistant (PDA), and/or other mobile computing device. In another example, the vehicle apparatus 20 may be a vehicle control system configured to autonomously drive a vehicle 5, assist in control of a vehicle 5, and/or the like.

In an example embodiment, a remote apparatus 10 may comprise components similar to those shown in the example remote apparatus 10 diagrammed in FIG. 2A. In an example embodiment, the remote apparatus 10 may be configured to train and/or utilize an up-sampling network. In an example embodiment, the remote apparatus 10 is configured to perform feature detection based on a low resolution image provided by a vehicle apparatus 20, provide map updates (e.g., one or more map tiles) to the vehicle apparatus 20, provide one or more instances of localization information/data (e.g., pose information/data) to the vehicle apparatus 20, and/or the like. In an example embodiment, a vehicle apparatus 20 may comprise components similar to those shown in the example vehicle apparatus 20 diagrammed in FIG. 2B. In various embodiments, the remote apparatus 10 may be located remotely from the vehicle apparatus 20. For example, a remote apparatus 10 may be a remotely located server, with respect to the vehicle apparatus 20, and/or an apparatus that is part of a Cloud-based computing environment and/or network.

Each of the components of the system may be in electronic communication with, for example, one another over the same or different wireless or wired networks 40 including, for example, a wired or wireless Personal Area Network (PAN), Local Area Network (LAN), Metropolitan Area Network (MAN), Wide Area Network (WAN), cellular network, and/or the like. In some embodiments, a network 40 may comprise the automotive cloud, digital transportation infrastructure (DTI), radio data system (RDS)/high definition (HD) radio or other digital radio system, and/or the like. For example, a vehicle apparatus 20 may be in communication with a remote apparatus 10 via the network 40. For example, the vehicle apparatus 20 may communicate with the remote apparatus 10 via a network, such as the Cloud. For example, the Cloud may be a computer network that provides shared computer processing resources and data to computers and other devices connected thereto. For example, the vehicle apparatus 20 may be configured to receive one or more map tiles of a digital map and/or localization information/data from the remote apparatus 10.

In an example embodiment, as shown in FIG. 2B, the vehicle apparatus 20 may comprise a processor 22, memory 24, a communications interface 26, a user interface 28, one or more location sensors 30 (e.g., a location sensor such as a GPS sensor; IMU sensors, and/or the like), one or more image capturing devices (e.g., camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras, 3D cameras, 360° cameras and/or the like) and/or other sensors that enable the vehicle apparatus 20 to determine one or more features of the corresponding vehicle's 5 surroundings, and/or other components configured to perform various operations, procedures, functions or the like described herein. In at least some example embodiments, the memory 24 is non-transitory and may store information/data corresponding to one or more parameters, features, and/or characteristics of the image capturing device 32. The memory 24 may further store information/data that identifies the correspondence between (a) the position of the vehicle 5 and the position of the location sensor 30, (b) the position of the location sensor 30 and the image capturing device 32, (c) the pose of the vehicle 5 and the field of view of the image capturing device 32, and/or the like.

Similarly, as shown in FIG. 2A, the remote apparatus 10 may comprise a processor 12, memory 14, a user interface 18, a communications interface 16, and/or other components configured to perform various operations, procedures, functions or the like described herein. In an example embodiment, the up-sampling network may operate (at least in part) on a central processing unit (CPU) or a graphics processing unit (GPU) of the remote apparatus 10. Certain example embodiments of the vehicle apparatus 20 and the remote apparatus 10 are described in more detail below with respect to FIGS. 2A and 2B.

II. Example Operation

In an example embodiment, an image and/or temporal sequence of images is captured (e.g., by an image capturing device 32 of a vehicle apparatus 20 onboard a vehicle 5). Due to bandwidth constraints, the image and/or temporal sequence of images is down-sampled and/or reduced in size to generate a low resolution image and/or temporal sequence of low resolution images before being provided (e.g., transmitted). A remote apparatus 10 may receive the low resolution image and/or the temporal sequence of low resolution images. Before the remote apparatus 10 may process the image (e.g., detect features within the image), the image may be up-sampled and/or converted to a higher-resolution image. For example, the remote apparatus 10 may generate an image having a pre-defined and/or configurable resolution and/or size based on the low resolution image and/or may generate a temporal sequence of images having a pre-defined and/or configurable resolution and/or size based on each of the low resolution images of the temporal sequence of low resolution images. For example, the pre-defined and/or configurable resolution and/or size may be selected such that the generated image has sufficient resolution for the processing of the image by one or more feature detectors and/or the like for detecting features within the generated images. In an example embodiment, the pre-defined and/or configurable resolution and/or size may be the resolution and/or size of the image as it was originally captured by the image capturing device 32. In an example embodiment, the pre-defined and/or configurable resolution and/or size may be 800×600 pixels, 1920×1080 pixels, and/or the like. In an example embodiment, the pre-defined and/or configurable resolution and/or size may be up to ten times the resolution and/or size of the low resolution image.

Common up-sampling techniques used to up-sample a low resolution image to a higher resolution tend to provide an image that is blocky (e.g., "pixelated") and/or suffers from global blurring. Thus, these common up-sampling techniques provide a higher resolution image having blurred and/or distorted features. For example, if the low resolution image comprises a portion of a road way with a double yellow line, the up-sampling of the image may cause the double yellow line to be blurred into a single yellow line in the resulting higher resolution image. If the resulting image is then provided to a feature detector that identifies lane lines within an image, the feature detector would only detect a single yellow line. If the detected features are used to update a feature map, the feature map may then be updated to not reflect the ground truth features of the location where the image was captured. If the detected features are used to perform a localization of the vehicle (e.g., to determine pose information/data for the vehicle), incorrect pose information/data may be determined due to the detected features not reflecting the features actually present at the location of the vehicle. In an example embodiment, pose information/data comprises a location (e.g., a geo-location indicating the physical location of the vehicle; a latitude and longitude) and/or a heading for the vehicle (e.g., a direction the vehicle is facing; an angle describing the direction the vehicle is facing with respect to a reference angle or location (e.g., North)).

Example embodiments of the present invention provide for generating a higher resolution image based on a low resolution image, wherein the features of the low resolution (and the originally captured image) are preserved and sharp in the generated higher resolution image. For example, embodiments of the present invention provide for generating a higher resolution image based on a low resolution image wherein the features of the low resolution (and the originally captured image) may be detected by analyzing the higher resolution image using a feature detector and/or the like. In an example embodiment, a deep neural network may be trained to generate a higher resolution image based on a low resolution image such that the features of the higher resolution image are sharp and accurately reflect the features present in the low resolution image. In an example embodiment, a deep neural network may be trained to generate a higher resolution image based on a temporal sequence of low resolution images such that the features of the higher resolution image are sharp and accurately reflect the features present in at least one of the images of the temporal sequence of low resolution images. In particular, the features present in the higher resolution images may be features that are present in two or more of the images of the temporal sequence of lower resolution images. For example, the deep neural network may be trained to perform a 3D convolution of the temporal sequence of low resolution images (and/or a temporal sequence of higher resolution images generated from the temporal sequence of low resolution images) to generate the higher resolution image having sharp and/or detectable features therein.

In an example embodiment, a deep neural network may be trained to act as an up-sampling network. For example, the up-sampling network may be trained to receive low resolution images (and/or temporal sequences of low resolution images) having a variety of resolutions, at various scales, and/or the like and generate higher resolution images based thereon. In an example embodiment, the scale of a low resolution image may refer to the up-sampling factor required to generate a higher resolution image of the pre-defined and/or configurable resolution and/or size based on the low resolution image. For example, the up-sampling network may be trained to generate higher resolution images of a pre-defined and/or configurable resolution and/or size independent of the starting resolution and/or size of the low resolution image. For example, the up-sampling network may be trained to receive a first low resolution image at a first scale and use a first set of network weights and/or parameters to generate a first higher resolution image of the pre-defined and/or configurable resolution and/or size and to receive a second low resolution image at a second scale and use a second set of network weights and/or parameters to generate a second higher resolution image of the pre-defined and/or configurable resolution and/or size. The up-sampling network may be trained to receive a third low resolution image at a third scale that is between the first scale and the second scale and to generate a third higher resolution image of the pre-defined and/or configurable resolution and/or size using the a third set of network weights and/or parameters that is determined by (e.g., non-linearly) interpolating between the first and second set of network weights and/or parameters. An interpolation function and the corresponding weights and/or parameters may be determined and/or learned based on the loss function and/or error-weight relationship at the different scales.

FIG. 3 illustrates schematic of how a higher resolution image of the pre-defined and/or configurable resolution and/or size may be generated based on various low resolution input images. For example, a low resolution image of scale $s_1$ may be received. The up-sampling network may use the first set of network weights and/or parameters to generate an image of the pre-defined and/or configurable resolution and/or size based a low resolution image described by scale $s_1$ with respect to the pre-defined and/or configurable resolution and/or size. Similarly, the up-sampling network may use the second set of network weights and/or parameters to generate an image of the pre-defined and/or configurable resolution and/or size based a low resolution image described by scale $s_2$ with respect to the pre-defined and/or configurable resolution and/or size, and so on. In an example embodiment, the up-sampling network may be configured to generate an image of the pre-defined and/or configurable resolution and/or size directly based on the low resolution image. In an example embodiment, the up-sampling network may be configured to generate an image of the next higher resolution based on the low resolution image and to bootstrap and/or iterate through the series of scales {s} until the image of the pre-defined and/or configurable resolution and/or size is generated.

Once the higher resolution image has been generated, the higher resolution image may be provided to one or more feature detectors and/or otherwise be processed, analyzed, and/or the like to detected one or more features within the image and/or extract feature information/data from the image. The detected one or more features and/or extracted feature information/data may be used to update a feature map that is stored as part of a digital map (e.g., as a layer of one or more tiles of digital map) and/or to perform an image based localization process (e.g., determine pose information/data for the vehicle 5). In an example embodiment, the remote apparatus 10 may be a computing entity and/or device that is part of a Cloud-based computing network and/or environment such that at least a portion of the computer processing resources required for performing localization of the vehicle 5 (e.g., determining pose information/data for the vehicle 5) may be provided via the Cloud-based computing network and/or environment.

An Exemplary Technique of Training the Up-Sampling Network

In an example embodiment, the remote apparatus may train a deep and/or neural network to act as an up-sampling network. In an example embodiment, the deep and/or neural network may be an encoder-decoder representation. In an example embodiment, the up-sampling network may be trained to receive a low resolution image and generate a higher resolution image of a pre-defined and/or configurable resolution and/or size based on the low resolution image. In an example embodiment, multiple sets of one or more network weights and/or parameters may be learned, wherein each set of network weights and/or parameters corresponds to a particular scale. In an example embodiment, the remote apparatus 10 may train a deep and/or neural network such that the one or more sets of network weights and/or parameters may be learned. In an example embodiment, the remote apparatus 10 may generate one or more instances of training information/data that may be used to train a deep and/or neural network to act as an up-sampling network. In an example embodiment, an instance of training information/data may comprise a sequence of training images. In an example embodiment, training the up-sampling network comprises determining one or more sets of network weights and/or parameters through an iterative network training process.

In an example embodiment, an instance of training information/data comprises a sequence of training images {I} comprising a plurality of images. One of the plurality of images may be a full resolution image, high definition resolution image, and/or the like and is referred to as a full resolution image $I_n$ herein. In an example embodiment, the full resolution image $I_n$ may be an image of the pre-defined and/or configurable resolution and/or size. The remainder of the plurality of images of the sequence of training images {I} may be images that are generated by down-sampling the full resolution image. For example, a series of scales {s} comprising one or more scales or factors may be pre-defined. In an example embodiment, an image may be generated for each scale $s_k$ of the series of scales {s}. For example, a reduced resolution image $I_k$ may be generated by down-sampling the full resolution image by a factor corresponding to the scale $s_k$ to generate a sequence of reduced resolution images {I'}. In an example embodiment, the set of one or more scales may comprise the scale $s_n$=1. The sequence of reduced resolution images {I'} may therefore comprise the plurality of reduced resolution images $I_k$ and the full resolution image $I_n$ (corresponding to the scale $s_n$=1 resulting in no down-sampling of the image) and the sequence of reduced resolution images may be equal to the sequence of training images (e.g., {I'}={I}). In another embodiment, the sequence of reduced resolution images {I'} may be generated and the full resolution image $I_n$ may be appended thereto (e.g., {I'}+$I_n$={I}). Thus, in an example embodiment, the sequence of training images may comprise a series of images that are ordered based on the scale of the image (e.g., {I}={$I_1$ (lowest resolution image), $I_2$ (low resolution image with a resolution higher than $I_1$), . . . , $I_{n-1}$ (image with a resolution higher than $I_{n-2}$ but lower than $I_n$), $I_n$ (full resolution image)}).

In an example embodiment, the sequence of training images {I} is received by the deep and/or neural network. The deep and/or neural network may then use local interpolation and/or up-sampling to generate an image of the pre-defined and/or configurable resolution and/or size based on reduced resolution image $I_k$ (1≤k≤n-1). For example, In an example embodiment, the local interpolation and/or up-sampling may use a nearest neighbor algorithm, an algorithm that defines a local neighborhood about a pixel that extends beyond nearest neighbors, and/or the like. The generated image may then be analyzed based on the full resolution image $I_n$ to determine a loss function. The network weights and/or parameters corresponding to the scale $s_k$ may then be updated, modified, and/or the like based on the determined loss function. Thus, a set of network weights and/or parameters may be learned for each scale of the series of scales {s}.

FIG. 4 provides flowchart illustrating operations performed, such as by the remote apparatus 10, to train the up-sampling network, in accordance with an example embodiment. Starting at block 102, one or more full resolution images are accessed and/or received. For example, the remote apparatus 10 may access and/or receive one or more full resolution images. For example, the remote apparatus 10 may comprise means, such as the processor 12, memory 14, communications interface 16, user interface 18, and/or the like, for accessing and/or receiving one or more full resolution images. In an example embodiment, full resolution images are images of the pre-defined and/or configurable resolution and/or size. In an example embodiment, the one or more full resolution images may be captured by one or more image capturing devices 32 of one or more vehicle apparatuses 20.

At block 104, an instance of training information/data may be generated. For example, sequence of training images {I} may be generated. In an example embodiment, a sequence of training images {I} comprises the full resolution image $I_n$ and a series of reduced resolution images {I'} generated by down-sampling the full resolution image. Each reduced resolution image $I_k$ of the series of reduced resolution images {I'} is generated by down-sampling the full resolution image by the scale $s_k$ of the pre-defined series of scales {s}. Various techniques may be used to down-sample the full resolution image to generate the reduced resolution images. In an example embodiment, the technique used to down-sample the full resolution image to generate the reduced resolution images is the technique that it is expected one or more vehicle apparatuses 20 will use to down-sample captured images to generate low resolution images.

At block 106, the deep and/or neural network may receive one or more instances of training information/data. For example, the deep and/or neural network may receive one or more sequences of training images {I}. For example, the remote apparatus 10 may provide the one or more sequences of training images {I} to the deep and/or neural network. For example, the remote apparatus 10 may cause the deep and/or neural network to receive the one or more sequences of training images {I}. For example, the remote apparatus 10 may comprise means, such as the processor 12, communications interface 16, and/or the like, for causing the deep and/or neural network to receive the one or more sequences of training images {I}. For example, in an example embodiment, the deep and/or neural network may operate (at least in part) on CPU and/or GPU of the remote apparatus 10.

At block 108, for each image $I_k$ of the sequence of training images (wherein 1≤k≤n-1 and the full resolution image is $I_n$), a higher resolution image is generated by interpolating and/or up-sampling the image $I_k$ from the scale $s_k$ to the pre-defined and/or configurable resolution and/or size $s_n$. For example, the deep and/or neural network operating (at least in part) on the remote apparatus 10 may generate a higher resolution by interpolating and/or up-sampling the image $I_k$ from the scale $s_k$ to the pre-defined and/or configurable resolution and/or size $s_n$ for 1≤k≤n-1. For example, the remote apparatus 10 may comprise means, such as processor 12 and/or the like, for generating a higher resolution by interpolating and/or up-sampling the image $I_k$ from the scale $s_k$ to the pre-defined and/or configurable resolution and/or size $s_n$ for 1≤k≤n-1. As should be understood, various techniques may be used to interpolate and/or up-sample the reduced resolution image $I_k$ from the scale $s_k$ to the pre-defined and/or configurable resolution and/or size $s_n$ within various layers of the deep and/or neural network.

Continuing with FIG. 4, at block 110, for each scale $s_k$ of the series of scales {s}, the higher resolution image generated based on the reduced resolution image $I_k$ may be analyzed in light of the full resolution image $I_n$ and a loss function may be determined, computed, generated, and/or the like based on the analysis. For example, the remote apparatus 10 may analyze the higher resolution image generated based on the reduced resolution image $I_k$ in light of and/or based on the full resolution image $I_n$ and determine, compute, generate and/or the like a loss function based on the analysis, for each scale $s_k$ of the series of scales {s}. For example, the remote apparatus 10 may comprise means, such as the processor 12 and/or the like, for analyzing the higher resolution image generated based on the reduced resolution image $I_k$ in light of and/or based on the full resolution image $I_n$ and determining, computing, generating and/or the like a loss function based on the analysis, for each scale $s_k$ of the series of scales {s}. In an example embodiment, a loss function may be determined, computed, generated, and/or the like based on and/or to quantify the analysis of the alignment of one or more features present in the higher resolution image generated based on the reduced resolution image $I_k$ and the full resolution image $I_n$. For example, a function quantifying the alignment of one or more features present in the full resolution image generated based on the reduced resolution image $I_k$ with the corresponding feature in the full resolution image $I_n$ may be evaluated, calculated, and/or the like based on the analysis of the higher resolution image generated based on the reduced resolution image $I_k$ and the full resolution image $I_n$ to provide a loss function. In an example embodiment, a cross-entropy based loss function is determined, calculated, and/or generated. In an example embodiment, the loss function may be determined, computed, generated, and/or the like by comparing patches of the full resolution image $I_n$ in which a feature detector has detected one or more features with corresponding patches of the higher resolution image. In an example embodiment, the loss function may be determined computed, generated, and/or the like by determining if features detected in the full resolution image are detected in the higher resolution image and the accuracy of the positioning of the detected features in the higher resolution image based on the full resolution image.

At block 112, one or more network weights and/or parameters are updated. For example, one or more network weights and/or parameters of one or more of the sets of network weights and/or parameters are updated, modified, and/or the like based on the loss function(s) determined, computed, generated, and/or the like for the corresponding scale $s_k$. For example, the $k^{th}$ set of network weights and/or parameters may be updated based on the loss function determined, computed, generated, and/or the like based on analyzing the higher resolution image generated based on the reduced resolution image $I_k$ and the full resolution image $I_n$. For example, the remote apparatus 10 may update, modify, and/or the like one or more network weights and/or parameters based on one or more loss functions. For example, the remote apparatus 10 may comprise means, such as the processor 12, memory 14, and/or the like, for updating, modifying, and/or the like one or more network weights and/or parameters based on one or more loss functions. For example, the one or more network weights and/or parameters may be updated to minimize one or more loss functions and/or the like. In an example embodiment, the one or more network weights and/or parameters may be updated using a stochastic gradient descent technique. In an example embodiment, the one or more network weights and/or parameters may be updated using a stochastic gradient descent technique using momentum, in which previous iterations of the network weights and/or parameters are remembered and the updates, modifications, and/or the like to the network weights and/or parameters are determined based at least in part on at least one previous iteration of the network weights and/or parameters. It should be understood that various techniques to update, modify, and/or the like the network weights and/or parameters to, for example, minimize the loss function may be utilized. In an example embodiment, two or more sequences of training images {I} may be analyzed before the network weights and/or parameters are updated and/or modified. For example, the $k^{th}$ set of network weights and/or parameters may be updated based on a set of loss functions corresponding to an analyses of a higher resolution images generated based on reduced resolution images $I_k$ for two or more sequences of training images {I}.

In one example embodiment, assuming that the features present in the higher resolution image generated based on the reduced resolution image $I_k$ and the corresponding features in the full resolution image $I_n$ are indexed by some common parameter i, one example loss function is loss=$\Sigma_i d_\theta$ ($f_i$, $f_i'$), where $f_i$ refers to the features from the higher resolution image, $f_i'$ refers to the features from the full resolution image $I_n$, and $d_\theta$ is a function that quantifies the alignment of the corresponding features. In an example embodiment, the alignment between corresponding features may comprise a distance between the position of the features in the higher resolution image and the full resolution image, and/or an angular alignment of the features in the higher resolution image and the full resolution image. In an example embodiment, the loss function is reduced and/or minimized as the alignment between the features in the higher resolution image and the full resolution image is improved and/or as the detectability and/or sharpness of the features within the higher resolution image are increased. Thus, the loss function may be used to encourage the up-sampling network to provide a more accurate and sharper higher resolution image based on the up-sampling of a reduced resolution image. For example, the loss function may be used to encourage the up-sampling network to generate a higher resolution image that has sharp enough features that the features therein may be accurately detected in the higher resolution image.

At block 114, it may be determined if the one or more sets of network weights and/or parameters have converged sufficiently to satisfy a convergence threshold requirement. In an example, if an update, modification, and/or the like to the one or more network weights and/or parameters is sufficiently small for one or more iterations, the convergence of the network weights and/or parameters may have converged sufficiently to satisfy a convergence threshold requirement. For example, the remote apparatus 10 may determine if the convergence of the one or more sets of network weights and/or parameters is sufficient to satisfy a convergence threshold requirement. For example, the remote apparatus 10 may comprise means, such as the processor 12 and/or the like, for determining if the convergence of the one or more sets of network weights and/or parameters is sufficient to satisfy a convergence threshold requirement.

If, at block 114, it is determined that the convergence of the one or more sets of network weights and/or parameters is not sufficient to satisfy the convergence threshold requirement, the process may return to blocks 102 and/or 106 to receive and/or access one or more additional full resolution images $I_n$ and/or to provide one or more instances of training information/data (e.g., sequences of training images {I}) to the deep and/or neural network to further train the up-sampling network (e.g., to further refine, determine, modify, and/or update one or more network weights and/or parameters of the one or more sets of network weights and/or parameters).

If, at block 114, it is determined that the convergence of the one or more sets of network weights and/or parameters is sufficient to satisfy the convergence threshold requirement, the process may continue to block 116. At block 116, the up-sampling network may be locked (e.g., the network weights and/or parameters may be fixed at their current values and not updated and/or modified further). The trained up-sampling network may then be used to generate higher resolution images based on received low resolution images. In an example embodiment, the up-sampling network may continue to train and/or learn one or more network weights and/or parameters after the convergence of the one or more sets of network weights and/or parameters is sufficient to satisfy the convergence threshold requirement.

As described above, the up-sampling network may interpolate and/or up-sample an image from a resolution described by scale $s_k$ with respect to the pre-defined and/or configurable resolution and/or size to the pre-defined and/or configurable resolution and/or size directly. In another example embodiment, the up-sampling network may be trained to interpolate and/or up-sample an image from a resolution described by scale $s_k$ with respect to the pre-defined and/or configurable resolution and/or size to a resolution described by scale $s_{k+1}$ with respect to the pre-defined and/or configurable resolution and/or size. This process may be iterated until the higher resolution image generated is of the pre-defined and/or configurable resolution and/or size. For example, the up-sampling network may be configured to generate a higher resolution image by boot-strapping through a sequence of scales. In such an embodiment, the up-sampling network may learn the $k^{th}$ set of network weights and/or parameters by generating an image of scale $s_{k+1}$ based on the image $I_k$ of scale $s_k$ and determining a loss function based on an analysis of the image of scale $s_{k+1}$ generated based on the image $I_k$ of scale $s_k$ and the reduced resolution image $I_{k+1}$ of the sequence of training images $\{I\}$.

In an example embodiment, the one or more sequences of training images $\{I\}$ may be generated before the training of the deep and/or neural network. In an example embodiment, one or more sequences of training images may be generated after the training of the deep and/or neural network has begun. In an example embodiment, the one or more sequences of training images may be bundled into sets of sequences of training images. The deep and/or neural network may process the each sequence of training images in the set of sequences training images, update the sets of network weights and/or parameters, and then process the same and/or a different set of sequences of training images. Thus, the training of the deep and/or neural network may not require the processing of each of the sequences of training images for each iteration of updating the sets of network weights and/or parameters. Moreover, multiple rounds of training over different sets of sequences of training images may provide for a more robust training of the up-sampling network. In one example embodiment, each of sequences of training images of the one or more sets of sequences of training images may be processed during each iteration of updating the sets network weights and/or parameters.

Another Exemplary Technique of Training the Up-Sampling Network

In an example embodiment, the remote apparatus may train a deep and/or neural network to act as an up-sampling network. In an example embodiment, the deep and/or neural network may be a convolution representation and an encoder-decoder representation (e.g., a combination thereof, a convolution network connected to an encoder-decoder representation, a convolution network sandwiched between two encoder-decoder networks, a convolution network embedded within an encoder-decoder network, and/or the like). In an example embodiment, the up-sampling network may be trained to receive a temporal sequence of low resolution images and generate a higher resolution image of a pre-defined and/or configurable resolution and/or size based on the temporal sequence of low resolution images. In an example embodiment, multiple sets of one or more network weights and/or parameters may be learned, wherein each set of network weights and/or parameters corresponds to a particular scale. In an example embodiment, the remote apparatus 10 may train a deep and/or neural network such that the one or more sets of network weights and/or parameters may be learned. In an example embodiment, the remote apparatus 10 may generate a series of temporal sequences of training images that may be used to train a deep and/or neural network to act as an up-sampling network. For example, a temporal sequence of images $\{I(t)\}$ may be used to generate an instance of training information/data. For example, each image in the temporal sequence of images $\{I(t)\}$ may be a full resolution image $I_n$. For each image in the temporal sequence of full resolution images $\{I(t)\}_n$, a sequence of reduced resolution images may be generated. In other words, in an example embodiment, a temporal sequence of reduced resolution images $\{I(t)\}_s$ may be generated for each scale in the pre-defined series of scales $\{s\}$. Thus, an instance of training information/data $\{\{I(t)\}_s\}$ may comprise a sequence of temporal sequences of reduced resolution images, wherein each of the temporal sequences has been down-sampled from the full resolution temporal sequence of images by a particular scale s. In an example embodiment, training the up-sampling network comprises determining one or more sets of network weights and/or parameters through an iterative network training process.

In an example embodiment, the up-sampling network may be trained to perform a convolution (e.g., a three dimensional convolution) of the temporal sequence of training images. For example, the up-sampling network may be configured to perform a convolution of a temporal sequence of reduced resolution images $\{I(t)\}_s$. The convolution may be used to identify one or more features that are present in two or more of the reduced resolution images of the temporal sequence of reduced resolution images $\{I(t)\}_s$ and/or patches of two or more of the reduced resolution images of the temporal sequence of reduced resolution images $\{I(t)\}_s$ that are similar. A composite reduced resolution image may be generated based on the identified features, similar patches and/or the like. The composite reduced resolution image may then be interpolated and/or up-sampled to generate a higher resolution image that may then be analyzed in light of at least one of the full resolution images of the temporal sequence of images $\{I(t)\}_n$ to determine a loss function.

In another example embodiment, each of the reduced resolution images of the temporal sequence of reduced resolution images $\{I(t)\}_s$ may be interpolated and/or up-sampled to generate a temporal sequence of higher resolution images $\{I(t)\}_n$. A convolution may then be performed on the images of the temporal sequence of higher resolution images $\{I(t)\}_n$ to generate a composite higher resolution image corresponding to a particular scale s. The composite higher resolution image may then be analyzed in light of at least one of the full resolution images of the temporal sequence of images $\{I(t)\}_n$ to determine a loss function. Thus, in example embodiments, a convolution of a temporal sequence of reduced resolution or higher resolution images may be used to provide a higher resolution image having sharp and/or detectable features and/or features that are accurately preserved from the full resolution image.

In an example embodiment, as indicated above, an instance of training information/data $\{\{I(t)\}_s\}$ comprises a plurality of images. For example, a temporal sequence of full resolution images $\{I(t)\}_n$ comprises an image $I(m)$ corresponding to time $t_m$. To build the instance of training information/data $\{\{I(t)\}_s\}$ corresponding to the temporal sequence of full resolution images $\{I(t)\}$, the full resolution image $I_n(m)$ is down-sampled a plurality of times to generate a reduced resolution image $I_k(m)$ for each scale $s_k$ for $1 \leq k \leq n-1$, for a series of n scales including a scale of 1 corresponding to the predefined and/or configurable resolution and/or size. Thus, for each $I_n(m)$, a sequence $\{I(m)\}_s$ is generated, wherein the sequence $\{I(m)\}_s$ comprises $I_n(m)$ and the plurality of reduced resolution images corresponding to $I_n(m)$. Thus, in an example embodiment, the sequence of images corresponding to full resolution image $I_n(m)$ comprises a series of images that are ordered based on the scale of the image (e.g., $\{I(m)\}_s = \{I(m)_1$ (lowest resolution image), $I(m)_2$ (low resolution image with a resolution higher than $I(m)_1$), . . . , $I(m)_{n-1}$ (image with a resolution higher than $I(m)_{n-2}$ but lower than $I(m)_n$), $I(m)_n$ (full resolution image corresponding to $t_m$)$\}$). The instance of training information/data $\{\{I(t)\}_s\}$ is the temporally ordered union of the sequences $\{I(m)\}_s$ for $-N \leq m \leq N$, wherein the temporal sequence of full resolution images $\{I(t)\}_n$ comprises $2N+1$ images each associated with a time.

It should be understood that the time range $t_{-N} \leq t \leq t_N$ is used in an illustrative manner, and various time ranges may be used. In an example embodiment, the time window of the time range $t_{-N} \leq t \leq t_N$ may be one second, three seconds, five seconds, and/or the like. Throughout the time window, a frame rate of 1 to 90 Hz may be used, in an example embodiment. For example, in one example embodiment, the time window may be 3 seconds and the frame rate may be 2 Hz. Thus, the temporal sequence of images may comprise 6 or 7 images based on the exact definition of the time window.

In an example embodiment, the instance of training information/data is received by the deep and/or neural network. For example, in one embodiment, the deep and/or neural network may then perform a convolution of a temporal sequence of reduced resolution images to generate a composite reduced resolution image and then use local interpolation and/or up-sampling to generate an image of the pre-defined and/or configurable resolution and/or size based on the temporal sequence of reduced resolution images $\{I(t)\}_k$ ($1 \leq k \leq n-1$). In an example embodiment, the local interpolation and/or up-sampling may use a nearest neighbor algorithm, an algorithm that defines a local neighborhood about a pixel that extends beyond nearest neighbors, and/or the like. For example, in one embodiment, the deep and/or neural network may generate a temporal sequence of higher resolution images based on a temporal sequence of reduced resolution images and then perform a convolution of the temporal sequence of higher resolution images to generate a composite higher resolution image of the pre-defined and/or configurable resolution and/or size based on the temporal sequence of reduced resolution images $\{I(t)\}_k$ ($1 \leq k \leq n-1$). The generated image may then be analyzed based on at least one of the full resolution image $I_n$ to determine a loss function. The network weights and/or parameters corresponding to the scale $s_k$ may then be updated, modified, and/or the like based on the determined loss function. Thus, a set of network weights and/or parameters may be learned for each scale of the series of scales $\{s\}$.

FIG. 5 provides flowchart illustrating operations performed, such as by the remote apparatus 10, to train the up-sampling network, in accordance with an example embodiment. Starting at block 202, one or more temporal sequences of full resolution images are accessed and/or received. For example, the remote apparatus 10 may access and/or receive one or more temporal sequences full resolution images. For example, the remote apparatus 10 may comprise means, such as the processor 12, memory 14, communications interface 16, user interface 18, and/or the like, for accessing and/or receiving one or more temporal sequences of full resolution images. In an example embodiment, full resolution images are images of the pre-defined and/or configurable resolution and/or size. In an example embodiment, a temporal sequence of full resolution images $\{I(t)\}_n$ comprises a plurality of full resolution image captured by one or more image capturing devices 32 (e.g., onboard a vehicle 5) over a time window in which the field of view captured in the one or more images substantially overlaps across all of the images in the temporal sequence of full resolution images. For example, two images may be considered to substantially overlap if at least one detectable and/or identifiable feature is present and/or identifiable in both images. In an example embodiment the images of the temporal sequence of full resolution images are captured by an image capturing device 32 over a time window of 1 to 5 seconds, and/or the like.

At block 204, an instance of training information/data is generated for at least one of the temporal sequences of full resolution images that were accessed and/or received. In an example embodiment, an instance of training information/data $\{\{I(t)\}_s\}$ comprises (a) the temporal sequence of full resolution images and (b) a plurality of temporal sequences of reduced resolution images. For example, the instance of training information/data may comprise a temporal sequence of reduced resolution images $\{I(t)\}_s$ for each scale of the series of scales $\{s\}$. In an example embodiment, a temporal sequence of reduced resolution images $\{I(t)\}_k$ corresponding to scale $s_k$ is generated by down-sampling two or more images of the temporal sequence of full resolution images $\{I(t)\}_n$ by a factor corresponding to the scale $s_k$ of training images $\{I\}$ may be generated. In an example embodiment, the technique used to down-sample the each image of the temporal sequence of full resolution images $\{I(t)\}_n$ to generate the one or more temporal sequences of reduced resolution images $\{I(t)\}_k$ is the technique that it is expected one or more vehicle apparatuses 20 will use to down-sample captured images to generate low resolution images. In an example embodiment, the remote apparatus 10 may generate an instance of training information/data corresponding to at least one of the temporal sequences of full resolution images $\{I(t)\}_n$ that were received and/or accessed. For example, the remote apparatus 10 may comprise means, such as the processor 12, memory 14, and/or the like, for generating an instance of training information/data based on at least one of the temporal sequences of full resolution images $\{I(t)\}_n$ that were received and/or accessed.

At block 206, the deep and/or neural network may receive one or more instances of training information/data $\{\{I(t)\}_s\}$. For example, the remote apparatus 10 may provide the one or more instances of training information/data $\{\{I(t)\}_s\}$ to the deep and/or neural network. For example, the remote apparatus 10 may cause the deep and/or neural network to receive the one or more instances of training information/data $\{\{I(t)\}_s\}$. For example, the remote apparatus 10 may comprise means, such as the processor 12, communications interface 16, and/or the like, for causing the deep and/or neural network to receive the one or more instances of training information/data $\{\{I(t)\}_s\}$. For example, in an example embodiment, the deep and/or neural network may operate (at least in part) on CPU and/or GPU of the remote apparatus 10.

At block 208, for each image $I(m)_k$ of the instances of training information/data $\{\{I(t)\}_s\}$ (wherein (a) k is an integer such that $1 \leq k \leq n-1$, (b) m is an integer such that $-N \leq m \leq N$, and (c) the full resolution image is $I_n(m)$ and corresponds to and/or was captured at time $t_m$), a higher resolution image is generated by interpolating and/or up-sampling the image $I(m)_k$ from the scale $s_k$ to the pre-defined and/or configurable resolution and/or size $s_n$. For example, the deep and/or neural network operating (at least in part) on the remote apparatus 10 may generate a higher resolution by interpolating and/or up-sampling the image $I(m)_k$ from the scale $s_k$ to the pre-defined and/or configurable resolution and/or size $s_n$ for $1 \leq k \leq n-1$. For example, the remote apparatus 10 may comprise means, such as processor 12 and/or the like, for generating a higher resolution image by interpolating and/or up-sampling the image $I(m)_k$ from the scale $s_k$ to the pre-defined and/or configurable resolution and/or size $s_n$ for $1 \leq k \leq n-1$. As should be understood, various techniques may be used to interpolate and/or up-sample the reduced resolution image $I(m)_k$ from the scale $s_k$ to the pre-defined and/or configurable resolution and/or size $s_n$ within various layers of the deep and/or neural network. Thus, a temporal sequence of higher resolution images may be generated for each scale $s_k$ based on the corresponding temporal sequence of reduced resolution images $\{I(t)\}_k$.

Continuing with FIG. 5, at block 210, for each scale $s_k$ of the series of scales $\{s\}$, a convolution (e.g., a 3D convolution) is performed for the corresponding temporal sequence of higher resolution images. For example, a convolution may be performed on the temporal sequence of higher resolution images that was generated from the temporal sequence of reduced resolution images $\{I(t)\}_k$ of scale $s_k$. For example, the convolution may identify patches of the higher resolution images in the temporal sequence of higher resolution images corresponding to the scale $s_k$ that are similar. In an example embodiment, a composite higher resolution image $C_k$ corresponding to the scale $s_k$ may be generated based on the convolution of the temporal sequence of higher resolution images corresponding to the scale $s_k$. The patches of the higher resolution images that are similar in two or more of the higher resolution images of the temporal sequence of higher resolution images may be used to generate a composite higher resolution image. In an example embodiment, the composite higher resolution image may correspond to time $t_0$ and/or another time $t_m$ for $-N \leq m \leq N$ of the temporal sequence of images.

In an example embodiment, a structure through motion technique may be used when identifying patches of higher resolution images of a temporal sequence of higher resolution images that are similar. In an example embodiment, the movement, change in position and/or heading, a sequence of poses and/or the like corresponding to the time window over which the temporal sequence of full resolution images was captured may be received and/or accessed along with the temporal sequence of full resolution images and provided to the deep and/or neural network as part of the instance of training information/data. Thus, in an example embodiment, a convolution may be performed to identify features common to multiple (e.g., two or more) higher resolution images of the temporal sequence of higher resolution images corresponding to scale $s_k$ and, based on the identified common features, a composite higher resolution image $C_k$ is generated. In an example embodiment, the composite higher resolution image $C_k$ may have sharper features than the individual higher resolution images over which the convolution was performed. For example, the deep and/or neural network operating (at least in part) on the remote apparatus 10 may perform a convolution of the images of the temporal sequence of higher resolution images generated based on the temporal sequence of reduced resolution images $\{I(t)\}_k$ corresponding to scale $s_k$ to generate a composite image $C_k$ for each scale $s_k$ of the series of scales. For example, the remote apparatus 10 may comprise means, such as processor 12 and/or the like, for performing a convolution of the images of the temporal sequence of higher resolution images generated based on the temporal sequence of reduced resolution images $\{I(t)\}_k$ corresponding to scale $s_k$ to generate a composite image $C_k$ for each scale $s_k$ of the series of scales.

At block 212, the composite image $C_k$, corresponding to scale $s_k$, is analyzed in light of at least one full resolution image $I_n(m)$, for each scale $s_k$ in the series of scales $\{s\}$. For example, the composite image $C_k$ may correspond to a time $t_0$, (e.g., to as to maximize the overlap of the images of the temporal sequence of full resolution images, reduced resolution images, and/or higher resolution images). In an example embodiment, the composite image $C_k$ is analyzed in light of the full resolution $I_n(0)$ corresponding to time $t_0$ and/or the middle image of the temporal sequence of full resolution images. For example, the deep net and/or neural network operating (at least in part) on the remote apparatus 10 may analyze the composite image $C_k$ in light of at least one full resolution image $I_n(m)$, for each scale $s_k$ in the series of scales $\{s\}$. For example, the remote apparatus 10 may comprise means, such as the processor 12 and/or the like for analyzing the composite image $C_k$ in light of at least one full resolution image $I_n(m)$, for each scale $s_k$ in the series of scales $\{s\}$. For example, it may be determined if features present, detectable, and/or identifiable in the full resolution image $I_n(m)$ are present, detectable, and/or identifiable in the composite image $C_k$.

At block 214, a loss function may be determined, generated, computed, and/or the like, for each scale $s_k$ of the series of scales $\{s\}$, based on the analysis of the composite higher resolution image $C_k$ in light of at least one the full resolution image $I_n(m)$. For example, the remote apparatus 10 may determine, generate, compute and/or the like a loss function based on the analysis of the composite image $C_k$ based on at least one of the full resolution images $I_n(m)$ of the temporal sequence of full resolution images $\{I(t)\}_n$, for each scale $s_k$ of the series of scales $\{s\}$. For example, the remote apparatus 10 may comprise means, such as the processor 12 and/or the like, for determining, generating, computing and/or the like a loss function based on the analysis of the composite image $C_k$ based on at least one of the full resolution images $I_n(m)$ of the temporal sequence of full resolution images $\{I(t)\}_n$, for each scale $s_k$ of the series of scales $\{s\}$. For example, the composite image $C_k$ may be generated to correspond to time $t_m$ and the loss function may be determined based on the analysis of the composite image $C_k$ in light of the full resolution image $I_n(m)$ corresponding to time $t_m$. For example, a loss function for the scale $s_k$ may be determined, generated, computed, and/or the like based on analyzing the composite image $C_k$ in light of the full resolution image $I_n(0)$ captured at $t_0$. In an example embodiment, a loss function may be determined, computed, generated, and/or the like based on and/or to quantify the analysis of the alignment of one or more features present in the composite image $C_k$ and the corresponding features in the full resolution image $I_n(m)$, or vice versa. For example, a function quantifying the alignment of one or more features present in the full resolution image $I_n(m)$ and the corresponding features in the composite image $C_k$ may be evaluated, calculated, and/or the like based on the analysis of the composite higher resolution image $C_k$ corresponding to the scale $s_k$ and the full resolution image $I_n(m)$ to provide a loss function. In an example embodiment, a cross-entropy based loss function is determined, calculated, and/or generated. In an example embodiment, the loss function may be determined, computed, generated, and/or the like by comparing patches of the full resolution image $I_n(m)$ in which a feature detector has detected one or more features with corresponding patches of the composite image $C_k$. In an example embodiment, the loss function may be determined computed, generated, and/or the like by determining if features detected in the full resolution image $I_n(m)$ are detected in the composite image $C_k$ and the accuracy of the positioning of the detected features in the composite image $C_k$ based on the full resolution image $I_n(m)$.

At block 216, one or more network weights and/or parameters are updated. For example, one or more network weights and/or parameters of one or more of the sets of network weights and/or parameters are updated, modified, and/or the like based on the loss function(s) determined, computed, generated, and/or the like for the corresponding scale $s_k$. For example, the $k^{th}$ set of network weights and/or parameters may be updated based on the loss function determined, computed, generated, and/or the like based on analyzing the higher resolution image generated based on the reduced resolution image $I_k$ and the full resolution image $I_n$. For example, the remote apparatus 10 may update, modify, and/or the like one or more network weights and/or parameters based on one or more loss functions. For example, the remote apparatus 10 may comprise means, such as the processor 12, memory 14, and/or the like, for updating, modifying, and/or the like one or more network weights and/or parameters based on one or more loss functions. For example, the one or more network weights and/or parameters may be updated to minimize one or more loss functions and/or the like. In an example embodiment, the one or more network weights and/or parameters may be updated using a stochastic gradient descent technique. In an example embodiment, the one or more network weights and/or parameters may be updated using a stochastic gradient descent technique using momentum, in which previous iterations of the network weights and/or parameters are remembered and the updates, modifications, and/or the like to the network weights and/or parameters are determined based at least in part on at least one previous iteration of the network weights and/or parameters. It should be understood that various techniques to update, modify, and/or the like the network weights and/or parameters to, for example, minimize the loss function may be utilized. In an example embodiment, two or more instances of training information/data $\{\{I(t)\}_s\}$ may be analyzed before the network weights and/or parameters are updated and/or modified. For example, the $k^{th}$ set of network weights and/or parameters may be updated based on a set of loss functions corresponding to an analysis of a composite image $C_k$ in light of a full resolution image $I_n(m)$ for two or more temporal sequences of reduced resolution images corresponding to scale $s_k$.

In one example embodiment, assuming that the features present in the composite image $C_k$ and the corresponding features in the full resolution image $I_n(m)$ are indexed by some common parameter i, one example loss function is loss=$\Sigma_i d_\theta(f_i, f_i')$, where $f_i$ refers to the features from the composite image, $f_i'$ refers to the features from the full resolution image $I_n(m)$, and $d_\theta$ is a function that quantifies the alignment of the corresponding features. In an example embodiment, the alignment between corresponding features may comprise a distance between the position of the features in the composite image and the full resolution image, and/or an angular alignment of the features in the composite image and the full resolution image. In an example embodiment, the loss function is reduced and/or minimized as the alignment between the features in the composite image and the full resolution image is improved and/or as the detectability and/or sharpness of the features within the composite image are increased. Thus, the loss function may be used to encourage the up-sampling network to provide a more accurate and sharper composite image based on the up-sampling of a temporal sequence of reduced resolution images. For example, the loss function may be used to encourage the up-sampling network to generate a composite image that has sharp enough features that the features therein may be accurately detected in the higher resolution image.

At block 218, it may be determined if the one or more sets of network weights and/or parameters have converged sufficiently to satisfy a convergence threshold requirement. In an example, if an update, modification, and/or the like to the one or more network weights and/or parameters is sufficiently small for one or more iterations, the convergence of the network weights and/or parameters may have converged sufficiently to satisfy a convergence threshold requirement. For example, the remote apparatus 10 may determine if the convergence of the one or more sets of network weights and/or parameters is sufficient to satisfy a convergence threshold requirement. For example, the remote apparatus 10 may comprise means, such as the processor 12 and/or the like, for determining if the convergence of the one or more sets of network weights and/or parameters is sufficient to satisfy a convergence threshold requirement.

If, at block 218, it is determined that the convergence of the one or more sets of network weights and/or parameters is not sufficient to satisfy the convergence threshold requirement, the process may return to blocks 202 and/or 206 to receive and/or access one or more additional temporal sequences of full resolution images $\{I(t)\}_n$ and/or to provide one or more instances of training information/data $\{\{I(t)\}_s\}$ to the deep and/or neural network to further train the up-sampling network (e.g., to further refine, determine, modify, and/or update one or more network weights and/or parameters of the one or more sets of network weights and/or parameters).

If, at block 218, it is determined that the convergence of the one or more sets of network weights and/or parameters is sufficient to satisfy the convergence threshold requirement, the process may continue to block 220. At block 220, the up-sampling network may be locked (e.g., the network weights and/or parameters may be fixed at their current values and not updated and/or modified further). The trained up-sampling network may then be used to generate composite higher resolution images of the pre-defined and/or configurable resolution and/or size based on received low resolution images. In an example embodiment, the up-sampling network may continue to train and/or learn one or more network weights and/or parameters after the convergence of the one or more sets of network weights and/or parameters is sufficient to satisfy the convergence threshold requirement.

As described above, the up-sampling network may interpolate and/or up-sample an image from a resolution described by scale $s_k$ with respect to the pre-defined and/or configurable resolution and/or size to the pre-defined and/or configurable resolution and/or size directly. In another example embodiment, the up-sampling network may be trained to interpolate and/or up-sample an image from a resolution described by scale $s_k$ with respect to the pre-defined and/or configurable resolution and/or size to a resolution described by scale $s_{k+1}$ with respect to the pre-defined and/or configurable resolution and/or size. This process may be iterated until the higher resolution image generated is of the pre-defined and/or configurable resolution and/or size. For example, the up-sampling network may be configured to generate a higher resolution image by boot-strapping the through a sequence of scales. In such an embodiment, the up-sampling network may learn the $k^{th}$ set of network weights and/or parameters by generating an image of scale $s_{k+1}$ based on the image $I_k$ of scale $s_k$ and determining a loss function based on an analysis of the image of scale $s_{k+1}$ generated based on the image $I_k$ of scale $s_k$ and the reduced resolution image $I_{k+1}$ of the sequence of training images $\{I\}$.

In an example embodiment, the one or more sequences of training images $\{I\}$ may be generated before the training of the deep and/or neural network. In an example embodiment, one or more sequences of training images may be generated after the training of the deep and/or neural network has begun. In an example embodiment, the one or more sequences of training images may be bundled into sets of sequences of training images. The deep and/or neural network may process the each sequence of training images in the set of sequences training images, update the sets of network weights and/or parameters, and then process the same and/or a different set of sequences of training images. Thus, the training of the deep and/or neural network may not require the processing of each of the sequences of training images for each iteration of updating the sets of network weights and/or parameters. Moreover, multiple rounds of training over different sets of sequences of training images may provide for a more robust training of the up-sampling network. In one example embodiment, each of sequences of training images of the one or more sets of sequences of training images may be processed during each iteration of updating the sets network weights and/or parameters. As described above, in an example embodiment, the convolution may be performed on the low resolution images and the composite low resolution image may be up-sampled to generate a composite higher resolution image. As discussed above, in an example embodiment, an image may be up-sampled directly from a scale $s_k$ to the pre-defined and/or configurable resolution and/or size. In an example embodiment, an image may be up-sampled from a scale $s_k$ to a scale $s_{k+1}$ in an iterative manner until an image of the pre-defined and/or configurable resolution and/or size is generated.

FIG. 6 illustrates four full resolution images 60A, 60B, 60C, and 60D. The four images 62A, 62B, 62C, and 62D were generated by down-sampling each of the full resolution images 60A, 60B, 60C, and 60D by a factor of 10, and then up-sampling the down-sampled images using a traditional up-sampling technique. As can be seen in images 62A, 62B, 62C, and 62D, the double yellow line has been blurred into a single yellow line and the features of the image are blocky and blurred, rather than sharp. The images 64A, 64B, 64C, and 64D are generated by down-sampling each of the full resolution images 60A, 60B, 60C, and 60D by a factor of 10, and then up-sampling the down-sampled images using an embodiment of the up-sampling network trained using a technique similar to that described above. Thus, images 64A, 64B, 64C, and 64D illustrate the result of up-sampling a down-sampled image according to an example embodiment of the present invention. As can be seen in images 64A, 64B, 64C, and 64D, the double yellow line is preserved as a double yellow line, and the features within the image are sharper than those in corresponding images 62A, 62B, 62C, and 62D.

Building a Feature Map Using the Up-Sampling Network

FIG. 7 is a flowchart illustrating processes and procedures that may be completed by the remote apparatus 10 (and/or vehicle apparatus 20) to build, generate, create, and/or update a feature map based on received low resolution images using the up-sampling network to provide an image of the pre-defined and/or configurable resolution and/or size having features that may be detectable and/or identifiable by a feature detector. In an example embodiment, a feature map may be library, database, repository, and/or the like of feature information/data extracted from higher resolution (and/or composite higher resolution) images generated by an up-sampling network, by a feature detector. In an example embodiment, a feature map and/or a portion thereof may be stored in association and/or as a part of (e.g., as a layer of) a digital map and/or digital map tile. Starting at block 302, an image and/or temporal sequence of images is/are captured and the corresponding pose information/data is determined. For example, a vehicle apparatus 20 may capture an image and/or temporal sequence of images and determine the corresponding pose information/data. For example the vehicle apparatus 20 may comprise means, such as the image capturing device 32, processor 22, memory 24, and/or the like for capturing an image and/or temporal sequence of images. The vehicle apparatus 20 may further comprise means, such as the location sensor 30 and/or the like, for determining pose information/data corresponding to the image and/or temporal sequence of images. For example, the vehicle apparatus 20 may comprise a real time clock and may cause the image capturing device 32 to capture an image (and/or temporal sequence of images) and the location sensor(s) 30 to determine pose information/data in parallel, sequentially, and/or approximately simultaneously such that the image is captured and the pose information/data is determined in real or near real time with respect to one another. In another example, the vehicle apparatus 20 may use the processor cycles to cause the image capturing device 32 to capture an image (and/or temporal sequence of images) and the location sensor(s) 30 to determine pose information/data in parallel, sequentially, and/or approximately simultaneously such that the image (and/or temporal sequence of images) is captured and the pose information/data is determined in real or near real time with respect to one another. In an example embodiment, pose information/data comprises a location (e.g., latitude and longitude) and/or a heading. For example, the pose information/data may comprise a location described by geospatial coordinates (e.g., latitude and longitude, and/or the like) that represent the current physical location of the vehicle 5 and/or the vehicle apparatus 20 on board the vehicle 5 at approximately the moment the captured image is captured. In an example embodiment, the pose information/data may comprise a heading describing the direction the vehicle 5 is currently facing and/or heading with respect to a reference direction at approximately the moment the captured image is captured. For example, the pose information/data may comprise the angle between a reference direction (e.g., North and/or the like) and the direction in which the front of the vehicle 5 is directed at approximately the moment when the corresponding image is captured. In an example embodiment, one instance of pose information/data is captured for each image of a temporal sequence of images.

In an example embodiment, the up-sampling network and/or feature detector operate on the remote apparatus 10 and/or another apparatus, for example, in a Cloud computing architecture. Moreover, the communication bandwidth between the remote apparatus 10 and the vehicle apparatus 20 may be constrained. Thus, at block 304, the image and/or temporal sequence of images may be down-sampled. For example, the vehicle apparatus 20 may down-sample the image and/or one or more images of the temporal sequence of images before providing them for processing by the remote apparatus 10, up-sampling network, and/or feature detector. For example, the vehicle apparatus 20 may comprise means, such as the processor 22 and/or the like, for down-sampling the image and/or a temporal sequence of images, before providing them for processing by the remote apparatus 10, up-sampling network, and/or feature detector. For example, the vehicle apparatus 20 may down-sample the image and/or temporal sequence of images to a scale $s_i$ with respect to the pre-defined and/or configurable resolution and/or size. Thus, the image and/or temporal sequence of images may be down-sampled to a low resolution image and/or a temporal sequence of low resolution images.

At block 306, the low resolution image and/or the temporal sequence of low resolution images and corresponding pose information/data are provided. For example, the vehicle apparatus 20 may provide (e.g., transmit) the low resolution image and/or temporal sequence of low resolution images and corresponding pose information/data. For example, the vehicle apparatus 20 may comprise means, such as the processor 22, the communications interface 26, and/or the like, for providing the low resolution image and/or the temporal sequence of low resolution images and corresponding pose information/data. For example, the remote apparatus 10 may receive the low resolution image and/or the temporal sequence of low resolution images and corresponding pose information/data. For example, the remote apparatus 10 may comprise means, such as the processor 12, communications interface 16, and/or the like, for receiving the low resolution image and/or the temporal sequence of low resolution images and corresponding pose information/data.

At block 308, the scale of the low resolution image and/or the images of the temporal sequence of low resolution images is determined. For example, the factor between the resolution and/or size of the low resolution image and the pre-defined and/or configurable resolution and/or size may be determined and based thereon, a scale $s_i$ may be determined. For example, the scale $s_i$ of the low resolution image and/or the images of the temporal sequence of low resolution images with respect to the pre-defined and/or configurable resolution and/or size is determined. For example, the remote apparatus 10 may determine the scale $s_i$ of the low resolution image and/or the images of the temporal sequence of low resolution images with respect to the pre-defined and/or configurable resolution and/or size. For example, the remote apparatus 10 may comprise means, such as the processor 12 and/or the like for determining the scale $s_i$ of the low resolution image and/or the images of the temporal sequence of low resolution images with respect to the pre-defined and/or configurable resolution and/or size. For example, the factor by which the low resolution image and/or an image of the temporal sequence of low resolution images needs to be up-sampled to generate an image of the pre-defined and/or configurable resolution and/or size maybe be determined and a scale $s_i$ may be determined based on the determined factor. In an example embodiment, the scale of the low resolution image(s) may be determined by analyzing at least one low resolution image and determining the resolution and/or size thereof and determining the scale and/or factor by which the at least one low resolution image would need to be up-sampled to provide an higher resolution image of the pre-defined and/or configurable resolution and/or size. In an example embodiment, a low resolution image may have meta data associated therewith. For example, the meta data may comprise pose information/data related to the pose of the vehicle 5 and/or the vehicle apparatus 20 when the full resolution image corresponding to the low resolution image was captured, a time stamp corresponding to the time at which the full resolution image corresponding to the low resolution image was captured, a resolution and/or size of the down-sampled image, a factor and/or scale by which the original full resolution image was down-sampled to generate the low resolution image, and/or the like. In an example embodiment, the vehicle apparatus 20 may provide the meta data corresponding to a low resolution image with the low resolution image and the remote apparatus 10 may receive the meta data corresponding to a low resolution image with the low resolution image. In an example embodiment, the meta data corresponding to a low resolution image may be analyzed to determine the scale and/or factor by which the low resolution image would need to be up-sampled to provide a higher resolution image of the pre-defined and/or configurable resolution and/or size.

At block 310, the appropriate network weights and/or parameters for generating a higher resolution and/or composite higher resolution image based on the low resolution image and/or temporal sequence of low resolution images are determined. For example, the remote apparatus 10 may determine the appropriate network weights and/or parameters for generating higher resolution and/or composite higher resolution image based on the low resolution image and/or temporal sequence of low resolution images. For example, the remote apparatus 10 may comprise means, such as the processor 12 and/or the like for determining the appropriate network weights and/or parameters for generating higher resolution and/or composite higher resolution image based on the low resolution image and/or temporal sequence of low resolution images. For example, the determined scale $s_i$ may be equivalent to a scale $s_k$ of the series of scales $\{s\}$. Thus, the $k^{th}$ set of network weights and/or parameters may be identified the appropriate network weights and/or parameters. In another example embodiment, the determined scale $s_i$ may be between two scales $s_k$ and $s_{k+1}$ of the series of scales $\{s\}$ (e.g., $s_k < s_i < s_{k+1}$). In such an example embodiment, the appropriate network weights and/or parameters may be a (non-linear) interpolation of the $k^{th}$ set of network weights and/or parameters and the $k+1^{th}$ set of network weights and/or parameters. For example, an interpolation function for interpolating between the $k^{th}$ and $k+1^{th}$ set of network weights and/or parameters may be determined and/or learned based on the loss function and/or error-weight relationship at the $s_k$ and/or $s_{k+1}$ scales.

At block 312, the up-sampling network generates a higher resolution image and/or composite higher resolution image based on the low resolution image and/or temporal sequence of low resolution images and the appropriate network weights and/or parameters. For example, the up-sampling network operating (at least in part) on the remote apparatus 10 may generate a higher resolution image and/or composite higher resolution image based on the low resolution image and/or temporal sequence of low resolution images and the appropriate network weights and/or parameters. For example, the remote apparatus 10 may comprise means, such as the processor 10 and/or the like, for generating a higher resolution image and/or composite higher resolution image based on the low resolution image and/or temporal sequence of low resolution images and the appropriate network weights and/or parameters. For example, the up-sampling network may up-sample and/or perform a convolution (e.g., a 3D convolution) to generate a higher resolution image and/or composite higher resolution image based on the low resolution image and the appropriate network weights and/or parameters.

At block 314, a feature detector analyzes the higher resolution image and/or composite higher resolution image to identify one or more features in the image. For example, feature detector operating (at least in part) on the remote apparatus 10, may be analyze the higher resolution image and/or the composite higher resolution image to identify one or more features in the image. For example, the remote apparatus 10 may comprise means, such as processor 12, and/or the like, for operating the feature detector to identify one or more features in the higher resolution image and/or the composite higher resolution image. In an example embodiment, the features identified by the feature detector may be stable, invariant, or static features that are expected to not change significantly over a time period (e.g., days, weeks, months, a year, a few years, and/or the like). For example, a feature may not change significantly with a change of seasons. In an example embodiment, the feature detector may extract feature information/data corresponding to the feature(s) identified in the higher resolution image and/or the composite higher resolution image. For example, the feature detector may extract feature information/data from the higher resolution image and/or the composite higher resolution image.

The identified features are then geo-tagged based on the pose information/data corresponding to the analyzed (composite) higher resolution image and/or the corresponding low resolution image and/or temporal sequence of low resolution images. For example, the feature detector operating (at least in part) on the remote apparatus 10 may geo-tag the identified features. For example, the remote apparatus 10 may comprise means, such as processor 12 and/or the like, for geo-tagging the identified features. In an example embodiment, geo-tagging a feature comprises analyzing the pose information/data corresponding to the corresponding low resolution image and/or the temporal sequence of low resolution images and the position of the feature in the (composite) higher resolution image to determine feature pose information/data. For example, the feature pose information/data may comprise a position (e.g., a geo-location, latitude and longitude, and/or the like) corresponding to the physical location of the feature. In an example embodiment, the feature pose information/data may comprise information/data indicating an orientation of the feature. The feature pose information/data may then be appended to, added to, and/or stored as part of the feature information/data. For example, the feature information/data may be stored in an array, XML, and/or other form of data architecture. Thus, the feature may be geo-tagged by associating and/or storing feature pose information/data for the feature with the corresponding feature information/data.

At block 316, the feature information/data may be used to develop, generate, and/or update a nighttime feature map. In an example embodiment, the feature map is stored in association with, linked to, stored as a layer of, and/or the like a map tile. For example, the remote apparatus 10 may link feature information/data corresponding to a feature located within Map Tile A and along Road Segment B with Map Tile A and/or with Road Segment B in the feature map. For example, the feature map may be stored as a layer of the digital map tile. For example, the remote apparatus 10 may develop, generate, and/or update a feature map. For example, the remote apparatus 10 may comprise means, such as processor 12, memory 14, and/or the like, for developing, generating, and/or updating a feature map. For example the feature map may be developed, generated, and/or updated by linking feature information/data corresponding to a feature to a map tile and/or road segment corresponding to the location of the corresponding feature within a feature map that is a layer of a digital map. For example, Map Tile A may be packaged to include the feature map as a layer of the map tile, the feature map comprising the feature information/data corresponding to one or more features that are located within Map Tile A.

At block 318, the feature map is provided. For example, the remote apparatus 10 provide (e.g., transmit) the feature map. For example, the remote apparatus 10 may comprise means, such as the processor 12, communications interface 16, and/or the like for providing the feature map. For example, one or more vehicle apparatuses 20 may receive the feature map. For example, one or more vehicle apparatuses 20 may comprise means, such as processor 22, memory 24, communications interface 26, and/or the like for receiving and storing a feature map. In an example embodiment, a map tile comprising the feature information/data, for example within a layer of the map tile, may be provided through communications network 40 to one or more vehicle apparatus 20. The vehicle apparatuses 20 may then use at least a portion of the feature information/data to perform localization and/or pose determination using optical and/or image-based techniques. In an example embodiment, a vehicle apparatus 20 may use at least a portion of the feature information/data embedded within a layer of a map tile to perform localization and/or pose determination to enable autonomous and/or assisted driving of a vehicle 5 that the vehicle apparatus 20 is onboard.

Performing Image-Based Localization Using the Up-Sampling Network

FIG. 8 is a flowchart illustrating processes and procedures that may be completed by the remote apparatus 10 to perform localization of a vehicle 5 using a Cloud-based computing network and/or environment, in one example embodiment. While the example described below relates to performing localization of a vehicle 5 using a Cloud-based computing network and/or environment, it should be understood that in one example embodiment the up-sampling network (e.g., network weights and/or parameters) may be provided to one or more vehicle apparatuses 20 and operated on a vehicle apparatus to perform localization of the vehicle 5 and/or another process. Starting at block 402, an image and/or temporal sequence of images is/are captured and the corresponding observed pose information/data is determined. For example, a vehicle apparatus 20 may capture an image and/or temporal sequence of images and determine the corresponding observed pose information/data. For example the vehicle apparatus 20 may comprise means, such as the image capturing device 32, processor 22, memory 24, and/or the like for capturing an image and/or temporal sequence of images. The vehicle apparatus 20 may further comprise means, such as the location sensor 30 and/or the like, for determining observed pose information/data corresponding to the image and/or temporal sequence of images. For example, the vehicle apparatus 20 may comprise a real time clock and may cause the image capturing device 32 to capture an image (and/or temporal sequence of images) and the location sensor(s) 30 to determine observed pose information/data in parallel, sequentially, and/or approximately simultaneously such that the image is captured and the observed pose information/data is determined in real or near real time with respect to one another. In another example, the vehicle apparatus 20 may use the processor cycles to cause the image capturing device 32 to capture an image (and/or temporal sequence of images) and the location sensor(s) 30 to determine observed pose information/data in parallel, sequentially, and/or approximately simultaneously such that the image (and/or temporal sequence of images) is captured and the observed pose information/data is determined in real or near real time with respect to one another. In an example embodiment, observed pose information/data comprises a location (e.g., latitude and longitude) and/or a heading. For example, the observed pose information/data may comprise a location described by geospatial coordinates (e.g., latitude and longitude, and/or the like) that represents the observed and/or expected current physical location of the vehicle 5 and/or the vehicle apparatus 20 on board the vehicle 5 at approximately the moment the captured image is captured. In an example embodiment, the observed pose information/data may comprise a heading describing the direction the vehicle 5 is observed and/or expected to currently be facing and/or heading with respect to a reference direction at approximately the moment the captured image is captured. For example, the observed pose information/data may comprise the observed and/or expected angle between a reference direction (e.g., North and/or the like) and the direction in which the front of the vehicle 5 is directed at approximately the moment when the corresponding image is captured. In an example embodiment, one instance of observed pose information/data is captured for each image of a temporal sequence of images.

In an example embodiment, the up-sampling network and/or feature detector operate on the remote apparatus 10, for example, in a Cloud computing architecture. Moreover, the communication bandwidth between the remote apparatus 10 and the vehicle apparatus 20 may be constrained. Thus, at block 404, the image and/or temporal sequence of images may be down-sampled. For example, the vehicle apparatus 20 may down-sample the image and/or one or more images of the temporal sequence of images before providing them for processing by the remote apparatus 10, up-sampling network, and/or feature detector. For example, the vehicle apparatus 20 may comprise means, such as the processor 22 and/or the like, for down-sampling the image and/or a temporal sequence of images, before providing them for processing by the remote apparatus 10, up-sampling network, and/or feature detector. For example, the vehicle apparatus 20 may down-sample the image and/or temporal sequence of images to a scale $s_i$ with respect to the pre-defined and/or configurable resolution and/or size. Thus, the image and/or temporal sequence of images may be down-sampled to generate a low resolution image and/or a temporal sequence of low resolution images.

At block 406, the low resolution image and/or the temporal sequence of low resolution images and the corresponding observed pose information/data are provided. For example, the vehicle apparatus 20 may provide (e.g., transmit) the low resolution image and/or temporal sequence of low resolution images and the corresponding observed pose information/data. For example, the vehicle apparatus 20 may comprise means, such as the processor 22, the communications interface 26, and/or the like, for providing the low resolution image and/or the temporal sequence of low resolution images and the corresponding observed pose information/data. For example, the remote apparatus 10 may receive the low resolution image and/or the temporal sequence of low resolution images and the corresponding observed pose information/data. For example, the remote apparatus 10 may comprise means, such as the processor 12, communications interface 16, and/or the like, for receiving the low resolution image and/or the temporal sequence of low resolution images and the corresponding observed pose information/data.

At block 408, the scale of the low resolution image and/or the images of the temporal sequence of low resolution images is determined. For example, the factor between the resolution and/or size of the low resolution image and the pre-defined and/or configurable resolution and/or size may be determined and based thereon, a scale $s_i$ may be determined. For example, the scale $s_i$ of the low resolution image and/or the images of the temporal sequence of low resolution images with respect to the pre-defined and/or configurable resolution and/or size is determined. For example, the remote apparatus 10 may determine the scale $s_i$ of the low resolution image and/or the images of the temporal sequence of low resolution images with respect to the pre-defined and/or configurable resolution and/or size. For example, the remote apparatus 10 may comprise means, such as the processor 12 and/or the like for determining the scale $s_i$ of the low resolution image and/or the images of the temporal sequence of low resolution images with respect to the pre-defined and/or configurable resolution and/or size. For example, the factor by which the low resolution image and/or an image of the temporal sequence of low resolution images needs to be up-sampled to generate an image of the pre-defined and/or configurable resolution and/or size maybe be determined and a scale $s_i$ may be determined based on the determined factor.

At block 410, the appropriate network weights and/or parameters for generating a higher resolution and/or composite higher resolution image based on the low resolution image and/or temporal sequence of low resolution images are determined. For example, the remote apparatus 10 may determine the appropriate network weights and/or parameters for generating higher resolution and/or composite higher resolution image based on the low resolution image and/or temporal sequence of low resolution images. For example, the remote apparatus 10 may comprise means, such as the processor 12 and/or the like for determining the appropriate network weights and/or parameters for generating higher resolution and/or composite higher resolution image based on the low resolution image and/or temporal sequence of low resolution images. For example, the determined scale $s_i$ may be equivalent to a scale $s_k$ of the series of scales $\{s\}$. Thus, the $k^{th}$ set of network weights and/or parameters may be identified the appropriate network weights and/or parameters. In another example embodiment, the determined scale $s_i$ may be between two scales $s_k$ and $s_{k+1}$ of the series of scales $\{s\}$ (e.g., $s_k < s_i < s_{k+1}$). In such an example embodiment, the appropriate network weights and/or parameters may be a (non-linear) interpolation of the $k^{th}$ set of network weights and/or parameters and the $k+1^{th}$ set of network weights and/or parameters. For example, an interpolation function for interpolating between the $k^{th}$ and $k+1^{th}$ set of network weights and/or parameters may be determined and/or learned based on the loss function and/or error-weight relationship at the $s_k$ and/or $s_{k+1}$ scales.

At block 412, the up-sampling network generates a higher resolution image and/or composite higher resolution image based on the low resolution image and/or temporal sequence of low resolution images and the appropriate network weights and/or parameters. For example, the up-sampling network operating (at least in part) on the remote apparatus 10 may generate a higher resolution image and/or composite higher resolution image based on the low resolution image and/or temporal sequence of low resolution images and the appropriate network weights and/or parameters. For example, the remote apparatus 10 may comprise means, such as the processor 10 and/or the like, for generating a higher resolution image and/or composite higher resolution image based on the low resolution image and/or temporal sequence of low resolution images and the appropriate network weights and/or parameters. For example, the up-sampling network may up-sample and/or perform a convolution (e.g., a 3D convolution) to generate a higher resolution image and/or composite higher resolution image based on the low resolution image and the appropriate network weights and/or parameters.

At block 414, an image-based localization of the vehicle 5 may be performed based on the higher resolution image and/or the composite higher resolution images and the corresponding pose information/data. For example, the remote apparatus 10 may perform an image-based localization of the vehicle 5 based on the (composite) higher resolution image and the corresponding pose information/ data. For example, the remote apparatus 10 may comprise means, such as processor 12 and/or the like, for performing an image-based localization of the vehicle 5 based on the (composite) higher resolution image and the corresponding pose information/data. For example, the (composite) higher resolution image may be analyzed to identify one or more image features within the image, for example, using a feature detector. One or more features that are expected to be present in the (composite) higher resolution image are identified based on the feature map and the observed pose information/data. For example, a map projection comprising the one or more features expected to be present in the (composite) higher resolution image based on the feature map and the observed pose information/data may be generated. Corrected pose information/data may then be determined, in an example embodiment. For example, the corrected pose information/data may describe the pose for the vehicle 5 within a desired accuracy level. For example, the corrected pose information/data may describe the pose of the vehicle 5 within a 10 cm accuracy. For example, the map projection comprising one or more features expected to be present in the (composite) higher resolution image may be compared to an encoded representation of the (composite) higher resolution image (e.g., generated by the feature detector) to determine the corrected pose information/data. For example, in an example embodiment, the map projection and the encoded representation of the (composite) higher resolution image may be provided to a trained deep net and/or neural network configured to determine corrected pose information/data based on analyzing and/or comparing the map projection and the encoded representation of the (composite) higher resolution image. For example, a missregistration and/or relative pose difference between the map projection and the encoded representation of the (composite) higher resolution image may be analyzed and used to determine corrected pose information/data. In an example embodiment, the correction is determined based on the result of the comparison and/or alignment of the map projection and the encoded representation of (composite) higher resolution the image. For example, a pose correction applied to the observed pose information/data to determine the corrected pose information/data may be equal in magnitude to the missregistration and/or relative pose difference between one or more features in the map projection and one or more corresponding image features in the encoded representation of the (composite) higher resolution image. For example, the corrected pose information/data may be determined in a manner similar to that described in co-pending U.S. patent application Ser. No. 15/375,513, filed Dec. 12, 2016, the contents of which are incorporated herein by reference.

Once the corrected pose information/data is determined, the remote apparatus 10 may provide (e.g., transmit) the corrected pose information/data. For example, the remote apparatus 10 may comprise means, such as the processor 12, communications interface 16, and/or the like for providing the corrected pose information/data. For example, the vehicle apparatus 20 may receive the corrected pose information/data. For example, the vehicle apparatus 20 may comprise means, such as the processor 22, communications interface 26, and/or the like for receiving the corrected pose information/data. After receiving the corrected pose information/data (e.g., responsive to receiving and/or processing the corrected pose information/data) the corrected pose information/data may then be provided through an output device of the vehicle apparatus 20 (e.g., a display of the user interface 28, and/or the like), communicated to another computing entity (e.g., another remote apparatus 10), and/or used as input to one or more processes executed by the vehicle apparatus 20 that require an accurate determination of the vehicle 5 and/or vehicle apparatus's 20 pose (e.g., location and/or heading). For example, the corrected pose information/data may be used as input to one or more processes used to autonomously drive the vehicle 5 and/or assist in driving the vehicle 5 (e.g., route planning and/or the like). For example, the vehicle apparatus 20 may make one or more route planning decisions and/or operate the vehicle 5 in accordance therewith based on the corrected pose information/data. Thus, the result of a localization determination may be the corrected pose information/data which may then be used by the vehicle apparatus 20 to perform route planning decisions and/or to operate the vehicle 5 in accordance therewith.

Thus, an accurate, real time (or near real time) determination of the pose (e.g., location and/or heading) of the vehicle 5 and/or vehicle apparatus 20 may be determined. In an example embodiment, the location of the vehicle 5 and/or vehicle apparatus 20 on board the vehicle 5 may be determined to within a predefined positional accuracy, such as an accuracy of 10 cm, under low illumination level conditions. Thus, in an example embodiment, the location and/or pose of the vehicle 5 and/or vehicle apparatus 20 may be determined with an accuracy that enables and/or facilitates autonomous operation of the vehicle 5 using a Cloud-based computing environment and/or network to perform and/or assist with localization.

III. Example Apparatus

The vehicle apparatus 20 and/or remote apparatus 10 of an example embodiment may be embodied by or associated with a variety of computing devices including, for example, a routing and navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the vehicle apparatus 20 and/or remote apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes, process images, perform localization determinations, and/or the like. For example, in an example embodiment, the vehicle apparatus 20 is an in vehicle routing and navigation system on board a vehicle 5 and the remote apparatus 10 is a server that is remotely located with respect to the vehicle apparatus 20 and/or that is part of a Cloud-based computing environment and/or network.

In this regard, FIG. 2A depicts a remote apparatus 10 and FIG. 2B depicts a vehicle apparatus 20 of an example embodiment that may be embodied by various computing devices including those identified above. As shown, the remote apparatus 10 of an example embodiment may include, may be associated with or may otherwise be in communication with a processor 12 and a memory device 14 and optionally a communication interface 16 and/or a user interface 18. In an example embodiment, the up-sampling network may operate (at least in part) on a CPU or a GPU of the remote apparatus 10. Similarly, a vehicle apparatus 20 of an example embodiment may include, may be associated with, or may otherwise be in communication with a processor 22, and a memory device 24, and optionally a communication interface 26, a user interface 28, one or more location sensors 30 (e.g., a location sensor such as a GPS sensor; IMU sensors, and/or the like), one or more image capturing devices (e.g., camera(s); 2D and/or 3D LiDAR(s); long, medium, and/or short range RADAR; ultrasonic sensors; electromagnetic sensors; (near-)IR cameras, 3D cameras, 360° cameras and/or the like) and/or other sensors that enable the vehicle apparatus to determine one or more features of the corresponding vehicle's surroundings, and/or other components configured to perform various operations, procedures, functions or the like described herein.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the remote apparatus 10 and/or vehicle apparatus 20 may each be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the remote apparatus 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The remote apparatus 10 and/or the vehicle apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the remote apparatus 10 and/or vehicle apparatus 20 of an example embodiment, a routing and navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the vehicle apparatus 20 may be configured to execute computer-executable instructions provided by and/or referred to by a data record. In an example embodiment, the remote apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more vehicle apparatuses. For example, the remote apparatus 10 may update the geographic database based on a most preferred version map tile as determined from a plurality of responses received from a plurality of vehicle apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a routing and navigation system that embodies a vehicle apparatus 20 in accordance with an example embodiment may determine the time to traverse a route that includes one or more turns at respective intersections more accurately.

IV. Apparatus, Methods, and Computer Program Products

As described above, FIGS. 3, 5, 6, and 7 illustrate flowcharts of apparatuses 10, 20, method, and computer program product according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus in communication with a Cloud-based computing environment, the apparatus comprising:
   a communications interface for communicating with the Cloud-based computing environment;
   a graphical processing unit configured to operate an up-sampling network; and
   a processing unit configured to:
   receive a temporal sequence of images comprising a plurality of down-sampled images (a) captured by an image capturing device of an apparatus and (b) down-sampled by the apparatus;
   determine a scale of the plurality of down-sampled images;
   cause the up-sampling network to receive the plurality of down-sampled images and the scale of the plurality of down-sampled images;
   cause the up-sampling network to determine appropriate network weights based on the scale of the plurality of down-sampled images; and
   cause the up-sampling network to generate a higher resolution image having a pre-defined scale based on the plurality of down-sampled images and the appropriate network weights, wherein (a) the higher resolution image is a composite higher resolution image and (b) generating the higher resolution image comprises up-sampling the plurality of down-sampled images to generate a temporal sequence of higher resolution images and performing a convolution of the temporal sequence of higher resolution images to generate the composite higher resolution image.

2. A method comprising:
   receiving a temporal sequence of images comprising a plurality of down-sampled images (a) captured by an image capturing device of an apparatus and (b) down-sampled by the apparatus;
   determining a scale of the plurality of down-sampled images;
   receiving, by an up-sampling network, the plurality of down-sampled images and the scale of the plurality of down-sampled images;
   determining, by the up-sampling network, appropriate network weights based on the scale of the plurality of down-sampled images; and
   generating, by the up-sampling network, a higher resolution image having a pre-defined scale based on the plurality of down-sampled images and the appropriate network weights, wherein (a) the higher resolution image is a composite higher resolution image and (b) generating the higher resolution image comprises up-sampling the plurality of down-sampled images to generate a temporal sequence of higher resolution images and performing a convolution of the temporal sequence of higher resolution images to generate the composite higher resolution image.

3. A method according to claim 2, wherein training the up-sampling network comprises:
   receiving or accessing a full resolution image;
   generating an instance of training data, wherein the instance of training data comprises (a) a plurality of down-sampled training images, the down-sampled training images being down-sampled representations of the full resolution image at a particular scale and (b) the full resolution image;
   receiving by a neural network the instance of training data;
   for a particular down-sampled training image of the instance of training data, generating an up-sampled training image;
   determining a loss function based on the up-sampled training image and the full resolution image; and
   modifying one or more network weights based on the loss function.

4. A method according to claim 3, wherein the higher resolution image is of the same resolution as the full resolution image.

5. A method according to claim 2, wherein at least one image of the temporal sequence of images is associated with pose information.

6. A method according to claim 2, wherein training the up-sampling network comprises:
receiving or accessing a temporal sequence of full resolution images;
generating an instance of training data, wherein the training data comprises (a) a plurality of temporal sequences of down-sampled images, the temporal sequences of down-sampled images being down-sampled representations of the temporal sequence of full resolution images at a particular scale and (b) the temporal sequence of full resolution images;
receiving by a neural network the instance of training data;
for a particular temporal sequence of the down-sampled images, generating a temporal sequence of higher resolution images;
performing a convolution of the temporal sequence of higher resolution images to generate a training composite higher resolution image;
determining a loss function based on the training composite higher resolution image and at least one full resolution image of the temporal sequence of full resolution images; and
modifying one or more network weights based on the loss function.

7. A method according to claim 2, wherein the up-sampling network is defined by a plurality of sets of network weights, wherein each set of network weights corresponds to a scale of a series of scales.

8. A method according to claim 7, wherein:
the series of scales comprises a first scale and a second scale,
the first scale corresponds to a first set of network weights and the second scale corresponds to a second set of network weights,
the scale of the image is between the first scale and the second scale, and
the appropriate network weights are determined based on the first set of network weights and the second set of network weights.

9. A method according to claim 2, wherein determining the scale of the image comprises at least one of analyzing the image, or analyzing meta data corresponding to the image.

10. A method according to claim 2, further comprising:
performing an image-based localization technique based on the higher resolution image to determine corrected pose information; and
associating the corrected pose information with the apparatus.

11. A method according to claim 2, further comprising:
receiving pose information corresponding to the image;
extracting feature information from the higher resolution image, the feature information corresponding to at least one feature detected within the higher resolution image; and
updating a feature map based on the pose information and the extracted feature information, the feature map being a layer of a digital map.

12. An apparatus comprising at least one processor, at least one memory storing computer program code, and an up-sampling network, the at least one memory and the computer program code configured to, with the processor, cause the apparatus to at least:
receive a temporal sequence of images comprising a plurality of down-sampled images (a) captured by an image capturing device and (b) down-sampled;
determine a scale of the plurality of down-sampled images;
receive, by the up-sampling network, the plurality of down-sampled images and the scale of the plurality of down-sampled images;
determine, by the up-sampling network, appropriate network weights based on the scale of the plurality of down-sampled images; and
generate, by the up-sampling network, a higher resolution image having a pre-defined scale based on the plurality of down-sampled images and the appropriate network weights, wherein (a) the higher resolution image is a composite higher resolution image and (b) generating the higher resolution image comprises up-sampling the plurality of down-sampled images to generate a temporal sequence of higher resolution images and performing a convolution of the temporal sequence of higher resolution images to generate the composite higher resolution image.

13. An apparatus according to claim 12, wherein training the up-sampling network comprises:
receiving or accessing a full resolution image;
generating an instance of training data, wherein the instance of training data comprises (a) a plurality of down-sampled training images, each of the down-sampled training images being a down-sampled representation of the full resolution image at a particular scale and (b) the full resolution image;
receiving by a neural network the instance of training data;
for a particular down-sampled training image of the instance of training data, generating an up-sampled training image;
determining a loss function based on the up-sampled training image and the full resolution image; and
modifying one or more network weights based on the loss function.

14. An apparatus according to claim 13, wherein the higher resolution image is of the same resolution as the full resolution image.

15. An apparatus according to claim 12, wherein at least one image of the temporal sequence of images is associated with pose information.

16. An apparatus according to claim 12, wherein training the up-sampling network comprises:
receiving or accessing a temporal sequence of full resolution images;
generating an instance of training data, wherein the training data comprises (a) a plurality of temporal sequences of down-sampled images, the temporal sequences of down-sampled images being down-sampled representations of the temporal sequence of full resolution images at a particular scale and (b) the temporal sequence of full resolution images;
receiving by a neural network the instance of training data;
for a particular temporal sequence of the down-sampled images, generating a temporal sequence of higher resolution images;
performing a convolution of the temporal sequence of higher resolution images to generate a training composite higher resolution image;

determining a loss function based on the training composite higher resolution image and at least one full resolution image of the temporal sequence of full resolution images; and modifying one or more network weights based on the loss function.

17. An apparatus according to claim 12, wherein:

the up-sampling network is defined by a plurality of sets of network weights, wherein a respective set of network weights corresponds to a scale of a series of scales, the series of scales comprises a first scale and a second scale, the first scale corresponds to a first set of network weights and the second scale corresponds to a second set of network weights, the scale of the image is between the first scale and the second scale, and the appropriate network weights are determined based on the first set of network weights and the second set of network weights.

18. An apparatus according to claim 12, wherein determining the scale of the image comprises at least one of analyzing the image, or analyzing meta data corresponding to the image.

19. An apparatus according to claim 12, wherein the at least one memory and the computer program code are further configured to, with the processor, cause the apparatus to at least:

perform an image-based localization technique based on the higher resolution image to determine corrected pose information; and associate the corrected pose information with an apparatus comprising the image capturing device.

20. An apparatus according to claim 12, wherein the at least one memory and the computer program code are further configured to, with the processor, cause the apparatus to at least:

receive pose information corresponding to the image;

extract feature information from the higher resolution image, the feature information corresponding to at least one feature detected within the higher resolution image; and update a feature map based on the pose information and the extracted feature information, the feature map being a layer of a digital map.

21. A computer program product comprising at least one non-transitory computer-readable storage medium having computer-executable program code instructions stored therein, the computer-executable program code instructions comprising program code instructions configured to:

receive a temporal sequence of images comprising a plurality of down-sampled images (a) captured by an image capturing device of an apparatus and (b) down-sampled by the apparatus;

determine a scale of the plurality of down-sampled images;

cause an up-sampling network to receive the plurality of down-sampled images and the scale of the plurality of down-sampled images;

cause the up-sampling network to determine appropriate network weights based on the scale of the plurality of down-sampled images; and cause the up-sampling network to generate a higher resolution image having a pre-defined scale based on the plurality of down-sampled images and the appropriate network weights, wherein (a) the higher resolution image is a composite higher resolution image and (b) generating the higher resolution image comprises up-sampling the plurality of down-sampled images to generate a temporal sequence of higher resolution images and performing a convolution of the temporal sequence of higher resolution images to generate the composite higher resolution image.

* * * * *